United States Patent [19]
Saito

[11] Patent Number: 5,889,892
[45] Date of Patent: Mar. 30, 1999

[54] LINE SYMMETRICAL FIGURE SHAPING APPARATUS

[75] Inventor: Shigeru Saito, Tokyo, Japan

[73] Assignee: NEC Corporation, Tokyo, Japan

[21] Appl. No.: 865,355

[22] Filed: May 29, 1997

[30] Foreign Application Priority Data

May 29, 1996 [JP] Japan ................................. 8-134513

[51] Int. Cl.⁶ ....................................................... G06K 9/00
[52] U.S. Cl. ........................................ 382/293; 382/286
[58] Field of Search .................................... 348/580, 581, 348/583, 87; 382/106, 141, 151, 153, 154, 170, 181, 190, 192, 195, 199, 203, 204, 205, 209, 217, 224, 243, 274, 275, 276, 277, 278, 284, 285, 286, 287, 288, 289, 291, 293, 294, 295, 296, 297, 298, 299, 309, 307; 345/187; 358/451; 356/375, 376

[56] References Cited

U.S. PATENT DOCUMENTS

| | | | |
|---|---|---|---|
| 4,468,688 | 8/1984 | Gabriel et al. | 348/580 |
| 4,981,372 | 1/1991 | Morimoto et al. | 382/288 |
| 5,115,107 | 5/1992 | Crooks et al. | 382/296 |
| 5,124,692 | 6/1992 | Sasson | 348/583 |
| 5,218,392 | 6/1993 | Sakamoto et al. | 354/106 |
| 5,231,674 | 7/1993 | Cleveland et al. | 282/289 |
| 5,317,652 | 5/1994 | Chatterjee | 382/291 |
| 5,335,295 | 8/1994 | Ferracini et al. | 382/298 |
| 5,412,203 | 5/1995 | Toyama | 250/223 B |
| 5,550,937 | 8/1996 | Bell et al. | 382/293 |
| 5,602,935 | 2/1997 | Yoshida et al. | 382/286 |
| 5,731,846 | 3/1998 | Krietman et al. | 348/581 |

FOREIGN PATENT DOCUMENTS

| | | | |
|---|---|---|---|
| 62-111369 | 5/1987 | Japan | G06K 9/68 |
| 63-261481 | 10/1988 | Japan | G06F 15/70 |

*Primary Examiner*—Leo H. Boudreau
*Assistant Examiner*—Bijan Tadayon
*Attorney, Agent, or Firm*—Foley & Lardner

[57] ABSTRACT

A feature point calculating device 21 calculates feature points with a sequence of input coordinate points. A symmetrical axis alternative calculating device 22 references the feature points and calculates symmetrical axis alternatives. A first determination symmetrical axis determining device 23 extracts the most horizontal symmetrical axis alternative and the most vertical symmetrical axis alternative from the symmetrical axis alternatives calculated by the symmetrical axis alternative calculating device 22. A first symmetry input point set calculating device 24 calculates symmetry determination segments of one of the horizontal and vertical symmetrical axis alternatives. A first symmetrical axis distance calculating device 25 calculates the distance between the center point of each symmetry determination segment and the symmetrical axis alternative. A first symmetry determining device 26 calculates a deviation of the calculated distances. When the deviation does not exceed a predetermined threshold value, the first symmetry determining device 26 determines that the input figure is line symmetrical to the symmetrical axis alternative. A symmetrizing process device 27 compensates the input figure so that sets of input coordinate points calculated by the first symmetry input point set calculating device 24 become line symmetrical to the symmetrical axis alternative.

54 Claims, 24 Drawing Sheets

F I G. 3a
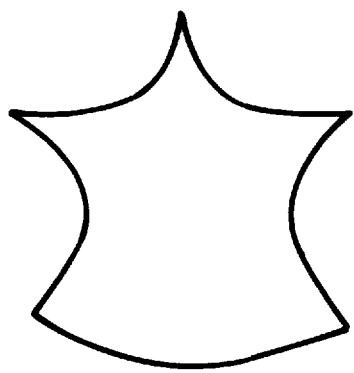
F I G. 3b
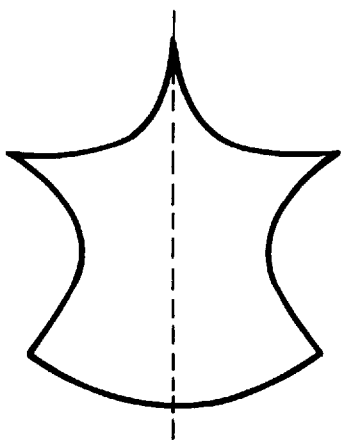
F I G. 4
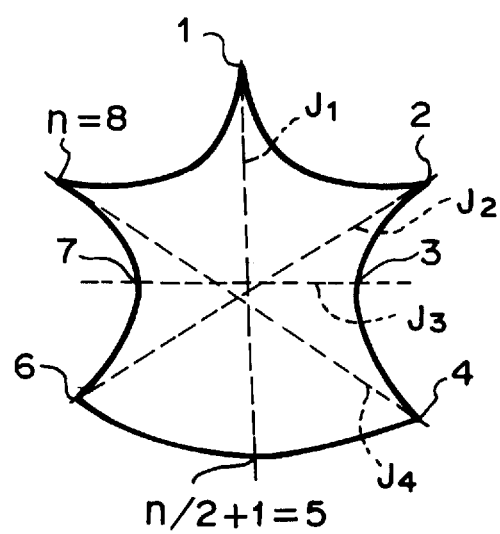

F I G. 5
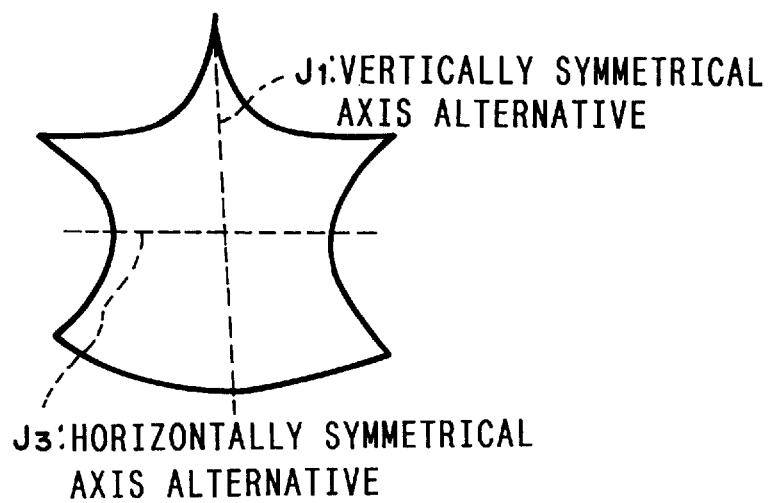
F I G. 6
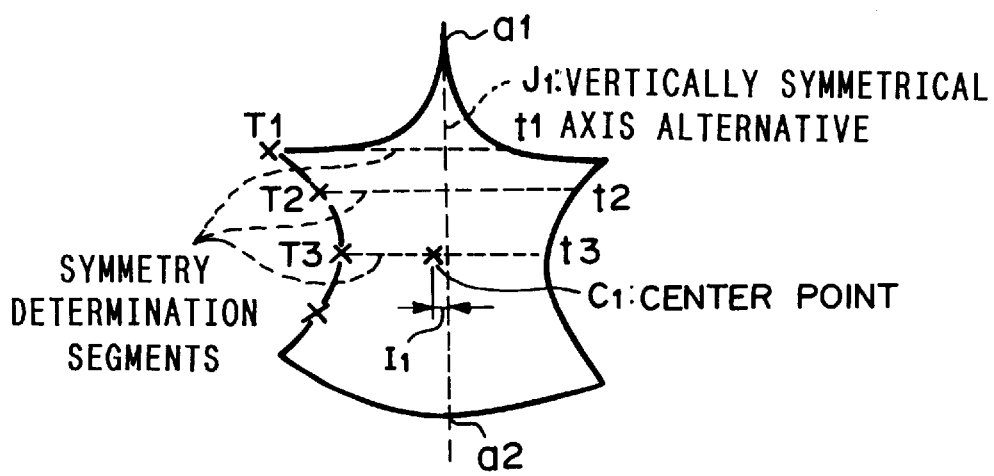

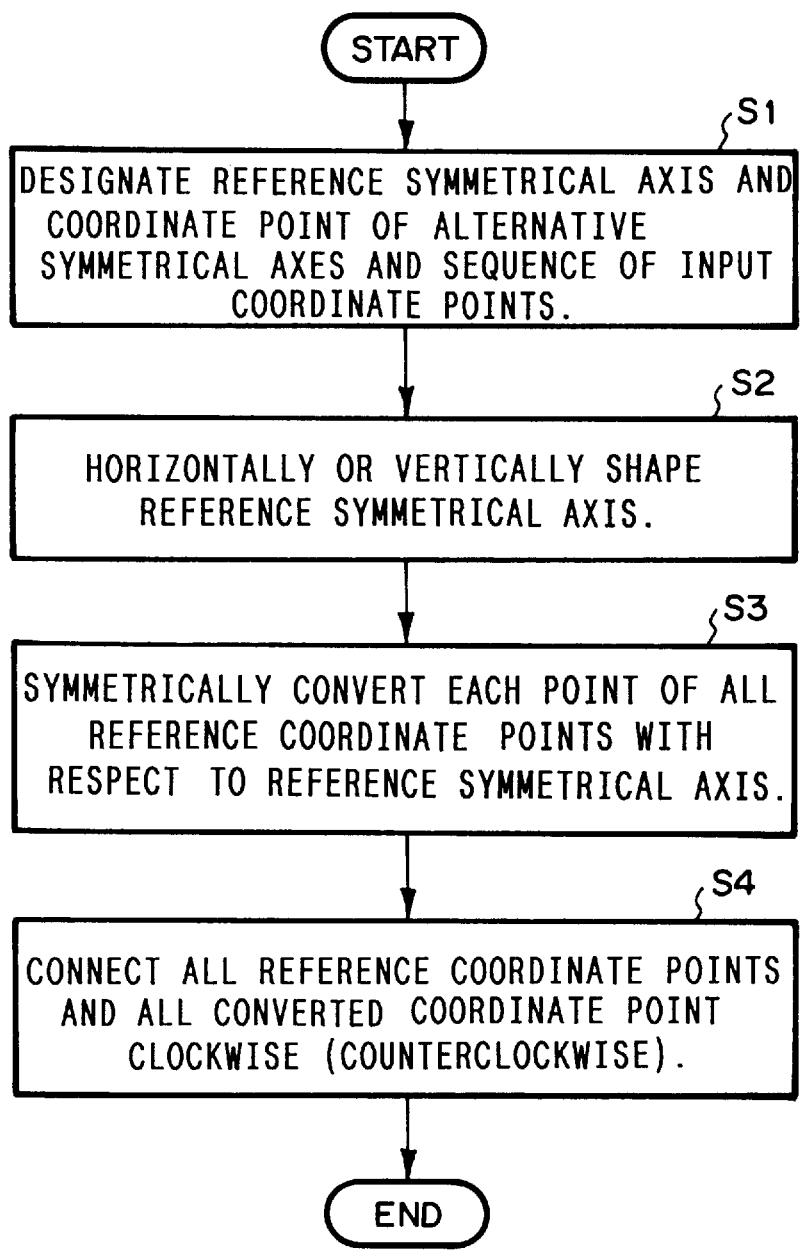

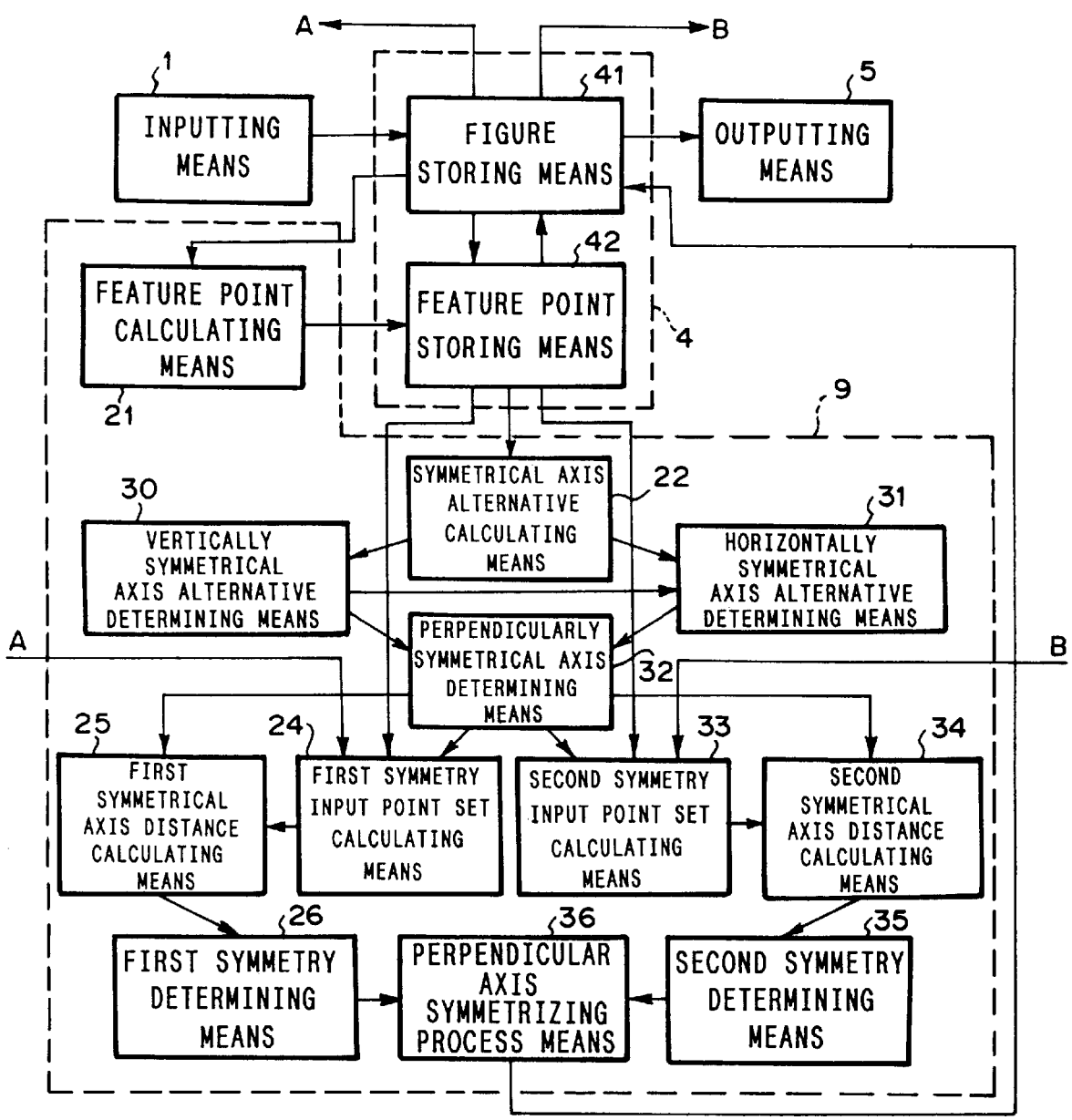
F I G.15

FIG. 17a    FIG. 17b
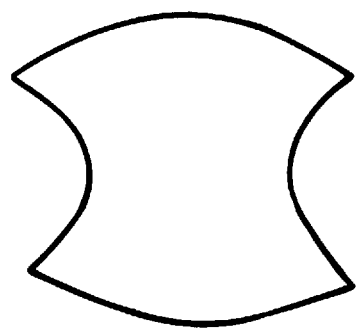
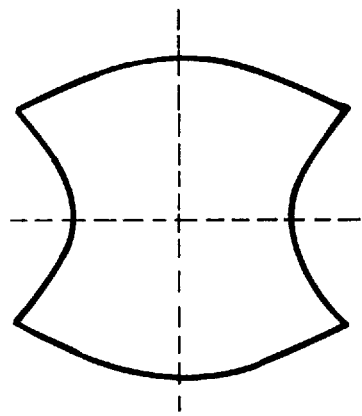
FIG. 18
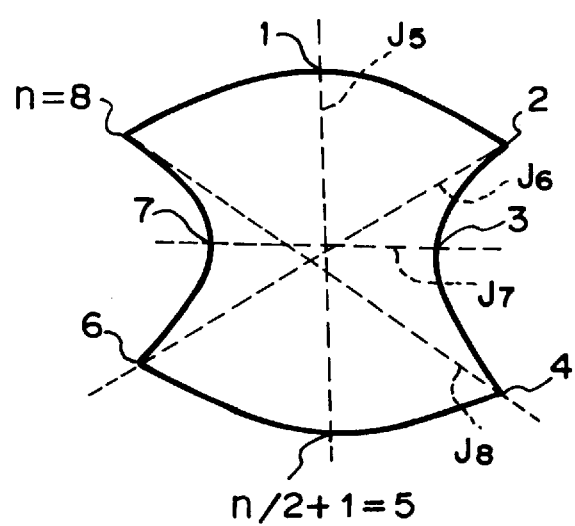

LINE SYMMETRICAL FIGURE SHAPING APPARATUS

BACKGROUND OF THE INVENTION

1. Field of the Invention

The present invention relates to a line symmetrical figure shaping apparatus, in particular, to a line symmetrical figure shaping apparatus for shaping a line symmetry of an input figure with respect to one or two symmetrical axes.

2. Description of the Related Art

Conventionally, as disclosed in Japanese Patent Laid-Open Publication No. 62-111369, a line symmetrical figure shaping apparatus of this type is used to automatically read a design drawing and recognize geometric symbols.

Next, with reference to the accompanying drawings, a first related art reference disclosed as Japanese Patent Laid-Open Publication No. 62-111369 will be described. FIG. 24 is a block diagram showing the structure of the first related art reference. Referring to FIG. 24, the apparatus according to the first related art reference comprises a recognizing process portion 101, a symbol table 102, and a symmetry converting portion 103. The recognizing process portion 101 comprises a symmetrical shape determining portion 111 and a comparing circuit 112.

Next, with reference to FIGS. 24 and 25, the operation of the apparatus according to the first related art reference will be described. FIG. 25 is a flow chart showing a process of the first related art reference.

An objective picture to be recognized is supplied to the recognizing process portion 101. The recognizing process portion 101 outputs a recognized result 1a as the recognized result of the input figure (at steps V1 and V2). The symmetrical figure determining portion 111 determines whether or not the recognized result 1a is a symmetrical symbol. To do that, the symmetrical figure determining portion 111 references a symbol table 102 that defines categories of symmetrical symbols and asymmetrical symbols (at step V3). At this point, unless the symbol is symmetrical, the recognized result 1a is treated as a recognized result of the symmetrical figure determining portion 111 (at step V10).

On the other hand, when the symmetrical figure determining portion 111 has determined that the symbol is symmetrical (namely, the determined result at step V3 is Yes), the symmetry converting portion 103 converts the symmetry of the input picture (at step V4).

Thereafter, the recognizing process portion 101 performs the recognizing process for the resultant picture once again. Thus, a recognized result 2a is obtained (at steps V5 and V6).

Next, the comparing circuit 112 compares the recognized result 1a with the recognized result 2a. When they match (namely, the determined result at step V7 is Yes), the recognized result 1a is output as a recognized result of the apparatus. When they do not match (namely, the determined result at step V7 is No), the recognized result is rejected as a non-recognized picture (at steps V7 to V9).

Next, as a second related art reference of the present invention, an apparatus as disclosed in Japanese Patent Laid-Open Publication 63-261481 will be described. The apparatus according to the second related art reference is used to recognize a drawing illustrated in a simplified drawing notation and compensate omitted dimensions in the drawing corresponding to the contents of the drawing.

Next, with reference to the accompanying drawings, the apparatus according to the second related art reference will be described. FIG. 26 is a block diagram showing the structure of the apparatus according to the second related art reference. Referring to FIG. 26, the apparatus according to the second related art reference comprises a figure recognizing unit 201, a symmetry alternative segment extracting means 202, a vertical segment designating means 203, a calculating means 204, and a drawing information designating means 205.

The figure recognizing unit 201 comprises a reading process portion 211, a picture data storing portion 212, a vector process portion 213, a vector categorizing process portion 214, a symbol recognizing process portion 215, a segment distinguishing process portion 216, a character recognizing process portion 217, and a recognized result storing portion 218.

Next, with reference to FIGS. 26 to 28, the operation of the apparatus according to the second related art reference will be described. FIG. 27 is a flow chart showing a process of the apparatus of the second related art reference. FIG. 28 is a schematic diagram for explaining a symmetry determining method of a shape line that intersects with a center line.

In the figure recognizing unit 201, drawing data is input from the reading process portion 211 to the picture data storing portion 212. The vector process portion 213 performs a broken line approximation for the picture data stored in the picture data storing portion 212, converts the picture data into vector data, and supplies the resultant data to the vector categorizing process portion 214.

The vector categorizing process portion 214 supplies symbols, segments, and characters of the vector data to the symbol recognizing process portion 215, the segment distinguishing process portion 216, and the character recognizing process portion 217, respectively. The segment distinguishing process portion 216 categorizes vector data that represents segments as shape lines, center lines, and so forth. The resultant data is stored in the recognized result storing portion 218. The symbol recognizing process portion 215 and the character recognizing process portion 217 distinguish symbols and characters. The distinguished symbols and characters are stored along with attributes based on the distinguished results to the recognized result storing portion 218 (at step W1).

Next, the symmetry alternative segment extracting means 202 extracts center lines that may be symmetrical to the input picture from the recognized result storing portion 218, counts the number of the center lines (at step W2), and determines whether there is a shape line that intersects with each of the center lines or a shape line that is isolated at an upper position, a lower position, a left position, or a right position of each of the center lines (at step W3). When there is a center line that intersects with a shape line or a center line that is isolated on both sides (namely, the determined result at step W4 is Yes), the vertical segment designating means 203 and the calculating means 204 distinguish a shape line or a symmetry in an isolated shapes.

Next, with reference to FIG. 28, a method for determining a symmetry will be described. For example, the vertical segment designating means 203 places a perpendicular L2 to a center line b from an edge point P2 of a vector. The calculating means 204 obtains a distance l2 between an edge point P2 and the center line b. In addition, the calculating means 204 obtains a distance m2 between a point of intersection X2 on a vector c that intersects with an extended line of the perpendicular L2 and the center line b.

The calculating means 204 calculates the difference between the two distances l2 and m2. When the following relation is satisfied with respect to a predetermined threshold value (Δ½), the calculating means 204 performs the same calculation for other edge points.

$$|l2-m2|<\Delta\tfrac{1}{2} \qquad (1)$$

When the formula (1) is satisfied for all edge points and the sum of the difference between each two individual distances is satisfied with respect to a predetermined threshold value Q, it is determined that the shape line is symmetrical with respect to the center line b (at step W5).

$$\Sigma|ln-mn|<Q \qquad (2)$$

After the symmetrical determinations of all the center lines have been performed, the drawing information designating means 205 designates omitted drawing information corresponding to part of drawing information of the shape lines symmetrical to the center lines (at step W7).

A first drawback of the line symmetrical figure forming apparatus according to the first related art reference is in that when a symmetrical figure that has not been defined is input, it cannot be determined as a symmetrical figure.

In other words, all figures to be determined as symmetrical figures should be defined to the symbol table 102.

A second drawback of the line symmetrical figure shaping apparatus according to the second related art reference is in that the user should draw a figure considering symmetrical axes beforehand.

In other words, only center lines drawn with a particular type of line are recognized as symmetrical axes.

SUMMARY OF THE INVENTION

A first object of the present invention is to provide a line symmetrical figure shaping apparatus for line-symmetrically shaping any curved line figure with respect to one line symmetrical axis.

A second object of the present invention is to provide a line symmetrical figure shaping apparatus for line-symmetrically shaping any curved line figure with respect to one set of line perpendicularly symmetrical axes.

A third object of the present invention is to provide a line symmetrical figure shaping apparatus for automatically extracting one line symmetrical axis or a set of two line symmetrical axes that are perpendicular to each other from a drawn curved line figure without need to consider symmetrical axes so as to generate a curved line figure that is line symmetrical to the extracted symmetrical axis (axes).

A fourth object of the present invention is to provide a line symmetrical figure shaping apparatus for quickly discarding symmetrical axis alternatives that do not have a symmetry so as to improve the process speed.

A fifth object of the present invention is to provide a line symmetrical figure shaping apparatus for selecting one of a plurality of valid symmetrical axis alternatives so as to shaping a figure with the selected symmetrical axis.

A sixth object of the present invention is to provide a line symmetrical figure shaping apparatus for allowing the user to designate an input coordinate point and an element for referencing the position of a symmetrical axis so as to generate a line symmetrical figure corresponding to the intention of the user.

A seventh object of the present invention is to provide a line symmetrical figure shaping apparatus for line-symmetrically shaping an input figure with respect to one of perpendicularly symmetrical axes even if the input figure is not symmetrical with respect to both the perpendicularly symmetrical axes.

A first aspect of the present invention is a line symmetrical figure shaping apparatus, comprising:

a feature point calculating means for calculating the coordinates of vertexes, the maximum point values of utmost limits and minimum point values of utmost limits in the horizontal direction and the vertical direction with a sequence of coordinate points stored in a figure storing means and storing the results as feature points of the input figure to a feature point storing means;

a symmetrical axis alternative calculating means for calculating symmetrical axis alternatives for determining a symmetry with the feature points stored in the feature point storing means;

a first determination symmetrical axis determining means for extracting the most horizontal symmetrical axis alternative and the most vertical symmetrical axis alternative from all the symmetrical axis alternatives calculated by the symmetrical axis alternative calculating means;

a first symmetry input point set calculating means for calculating sets of input coordinate points to be determined for a symmetry of the input figure corresponding to one of the symmetrical axis alternatives calculated by the first determination symmetrical axis determining means and connecting the sets of calculated vertexes with straight lines so as to obtain symmetry determination segments;

a first symmetrical axis distance calculating means for calculating the distance between the center point of each of the symmetry determination segments and each of the symmetrical axis alternatives;

a first symmetry determining means for calculating a deviation of the distance between the center points of each of the symmetry determination segments and each of the symmetrical axis alternatives so as to determine a line symmetry of the input figure; and a symmetrizing process means for changing the coordinates of the input points so that the input figure becomes a figure that is line symmetrical to the symmetrical axis alternatives when the symmetry determining means has determined that the input figure has a symmetry.

A second aspect of the present invention is the line symmetrical figure shaping apparatus of the first aspect, further comprising:

a symmetry input point set validity determining means for determining the validity of each of the symmetry determination segments to the symmetrical axis alternatives with values calculated by the symmetrical axis distance calculating means.

A third aspect of the present invention is the line symmetrical figure shaping apparatus of the first aspect or the second aspect, further comprising:

a shaping symmetrical axis determining means for a plurality of determining symmetrical axis alternatives for a line symmetrical shaping process when the symmetrical axis alternatives are valid as symmetrical axes of the input figure.

A fourth aspect of the present invention is the line symmetrical figure shaping apparatus of the first aspect, the second aspect, or the third aspect, further comprising:

a shaping reference designating means for designating an element as a reference for shaping the input figure or an element to be referenced when the symmetrizing process means line-symmetrically shapes the input figure.

A fifth aspect of the present invention is a line symmetrical figure shaping apparatus, comprising:

a feature point calculating means for calculating the coordinates of vertexes, the maximum point values of utmost limits and minimum point values of utmost limits in the horizontal direction and the vertical direction with a sequence of coordinate points stored in a figure storing means and storing the results as feature points of the input figure to a feature point storing means;

a symmetrical axis alternative calculating means for calculating symmetrical axis alternatives for determining a symmetry with the feature points stored in the feature point storing means;

a first determination symmetrical axis determining means for extracting the most horizontal symmetrical axis alternative and the most vertical symmetrical axis alternative from all the symmetrical axis alternatives calculated by the symmetrical axis alternative calculating means;

a horizontal symmetrical axis alternative determining means for extracting one of horizontal symmetrical axis alternatives from vertical symmetrical axis alternatives extracted by the vertical symmetrical axis alternative calculating means in all the symmetrical axis alternatives calculated by the symmetry axis alternative calculating means;

a perpendicularly symmetrical axis determining means for determining whether or not two symmetrical axis alternatives extracted by the vertical symmetrical axis alternative determining means and the horizontal symmetrical axis alternative determining means are perpendicular to each other;

a first symmetry input point set calculating means for calculating sets of input coordinate points for determining a symmetry of the input figure corresponding to the vertical symmetrical axis alternatives calculated by the vertical symmetrical axis alternative determining means when the perpendicularly symmetrical axis determining means has determined that the two symmetrical axis alternatives are perpendicular to each other and for connecting the sets of the calculated input coordinate points with straight lines so as to generate symmetry determination segments;

a first symmetrical axis distance calculating means for calculating the distance between the center point of each of the symmetry determination segments and each of the symmetrical axis alternatives;

a first symmetry determining means for calculating a deviation of the distance between the center points of each of the symmetry determination segments and each of the symmetrical axis alternatives so as to determine whether or not the input figure is line symmetrical to the vertical symmetrical axis alternatives;

a second symmetry input point set calculating means for performing the same process as the first symmetry input point set calculating means for the horizontal symmetry axis alternatives extracted by the horizontal symmetry axis alternative determining means;

a second symmetrical axis distance calculating means for performing the same process as the first symmetrical axis distance calculating means for the horizontal symmetry axis alternatives extracted by the horizontal symmetry axis alternative determining means;

a second symmetry determining means for performing the same process as the first symmetry determining means for the horizontal symmetry axis alternatives extracted by the horizontal symmetry axis alternative determining means; and a perpendicularly symmetrizing process means for changing coordinates of input points so that the input figure becomes line-symmetrical to the vertical symmetrical axis alternatives and the horizontal symmetrical axis alternatives.

A sixth aspect of the present invention is the apparatus of the fifth aspect, further comprising:

a one-axis symmetrizing process means for line-symmetrically shaping the input figure even if the input figure is not line symmetrical to both perpendicularly symmetrical axis alternatives when the input figure is symmetrical to one of the two perpendicularly symmetrical axis alternatives.

An input figure that is input by the inputting means is stored as a sequence of coordinate points corresponding to a curved line to the figure storing means. The feature point calculating means calculates the coordinates of vertexes, the maximum point values and the minimum point values in the horizontal direction and the vertical direction corresponding to the sequence of the input coordinate points and stores the results as feature points of the input figure to the feature point storing means.

Next, the symmetrical axis alternative calculating means references the feature points stored in the feature point storing means, combines m-th and (n/2+m)-th (where m=1, 2, . . . ) feature points of the input figure having n feature points, and outputs obtained sets as symmetrical axis alternatives. Next, the first determination symmetrical axis determining means extracts the most horizontal symmetrical axis alternative and the most vertical symmetrical axis alternative from all the symmetrical axis alternatives calculated by the symmetrical axis alternative calculating means.

One of the symmetrical axis alternatives is processed as follows. First of all, the first symmetry input point set calculating means successively traces input coordinate points on one side of the symmetrical axis alternative from one feature point that intersects with the symmetrical axis alternative to another feature point. At this point, a perpendicular is placed from an input coordinate point traced at the n-th tracing operation (where n=1, 2, . . . ) to the symmetrical axis alternative. At this point, the input coordinate points and the input coordinates on the opposite side of the symmetrical axis alternatives that are perpendicular to the perpendicular are treated as sets. Segments that connect them are treated as symmetrical determination segments.

Next, the first symmetrical axis distance calculating means calculates the coordinate of the center point of each of the symmetry determination segments and calculates the distance between the center point of each of the symmetry determination segments and each of the symmetrical axis alternatives.

The first symmetry determining means calculates a deviation of the obtained distances. When the calculated value does not exceed a predetermined threshold value, the first symmetry determining means determines that the input figure is line-symmetrical to the symmetrical axis.

When the symmetry determining means has determined that the input figure is line symmetrical, the symmetrizing process means compensates the input coordinate points so that the sets of the input coordinates calculated by the first symmetry input point set calculating means become line-symmetrical to the symmetrical axis alternatives.

These and other objects, features and advantages of the present invention will become more apparent in light of the

BRIEF DESCRIPTION OF DRAWINGS

FIGS. 3a and 3b are schematic diagrams showing an input figure and a shaped figure thereof for explaining the first embodiment of the present invention;

FIG. 4 is a schematic diagram showing an example of a symmetrical axis alternative calculated by a symmetrical axis alternative calculating means 22;

FIG. 5 is a schematic diagram showing examples of a horizontal symmetrical axis alternative and a vertical symmetrical axis alternative extracted by a first determination symmetrical axis determining means 23 from the symmetrical axis alternatives shown in FIG. 4;

FIG. 6 is a schematic diagram showing an example of a method for determining a symmetry using symmetry determination segments;

FIG. 7 is a flow chart showing a process of a symmetrizing process means 27;

FIG. 15 is a block diagram showing a process of a fifth embodiment of the present invention;

FIGS. 17a and 17b are schematic diagrams showing an input figure and a shaped figure thereof for explaining the fifth embodiment;

FIG. 18 is a schematic diagram showing examples of symmetrical axis alternatives calculated by a symmetrical axis alternative calculating means 22;

DESCRIPTION OF PREFERRED EMBODIMENTS

[First Embodiment]

Next, with reference to the accompanying drawings, a first embodiment of the present invention will be described.

Figure 1:
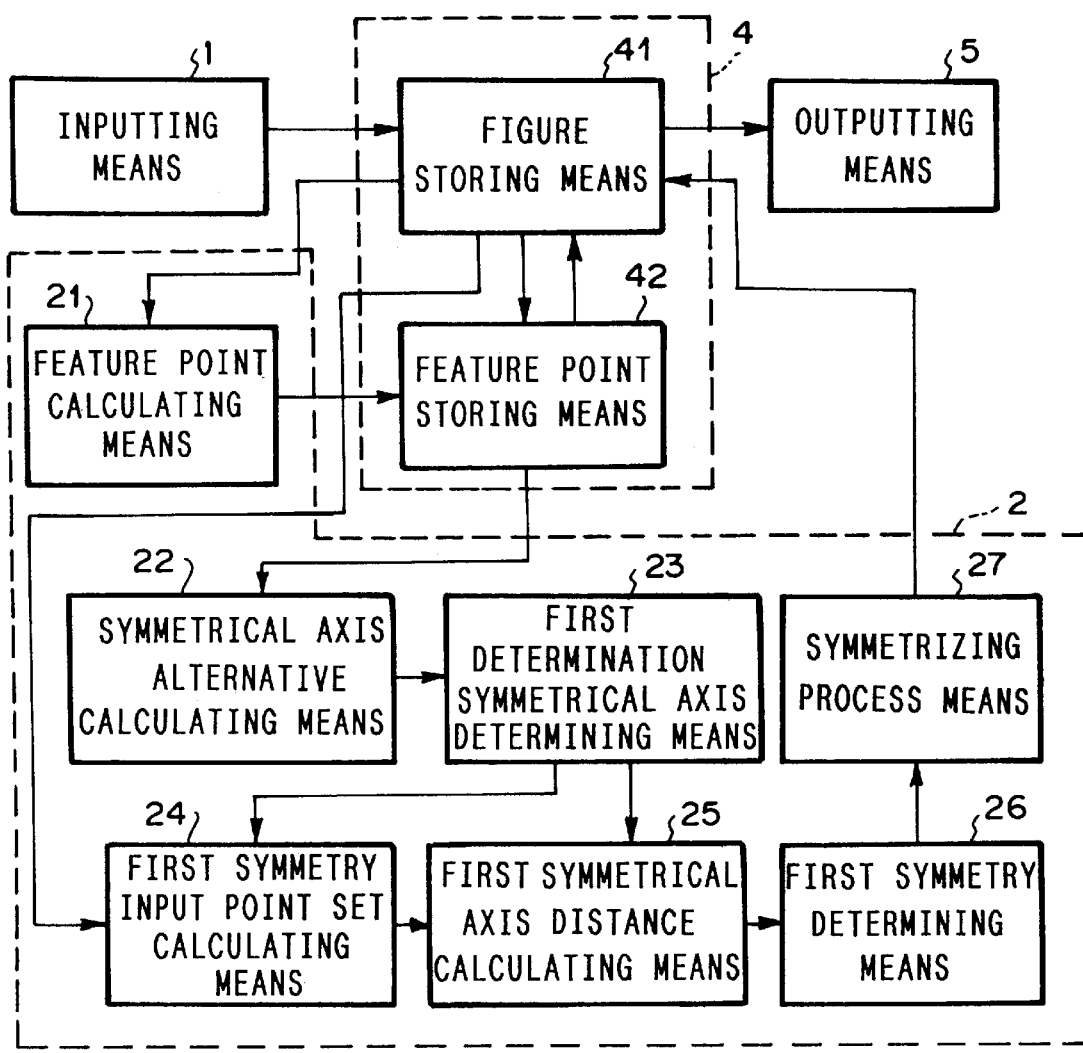
FIG. 1 is a block diagram showing a first embodiment of the present invention.

FIG. 1 is a block diagram showing the first embodiment of the present invention. Referring to FIG. 1, the first embodiment of the present invention comprises an inputting means 1, a data process unit 2, a storing means 4, and an outputting means 5. The inputting means 1 inputs a figure with a keyboard, a mouse, and/or a pen. Alternatively, the inputting means 1 inputs a figure from a record medium such as a floppy disk, a magnetic tape, or a magnetic memory. The data process unit 2 operates with a program that includes a process means corresponding to a figure. The storing means 4 stores figure information and feature points. Examples of the storing means 4 are a hard disk, a DRAM, a FIFO, a flash memory, and a cache memory. Examples of the outputting means 5 are a display unit and a printer.

The data process means 2 comprises a feature point calculating means 21, a symmetrical axis alternative calculating means 22, a first determination symmetrical axis determining means 23, a first symmetry input point set calculating means 24, a first symmetrical axis distance calculating means 25, a first symmetry determining means 26, and a symmetrizing process means 27. The storing means 4 comprises a figure storing means 41 and a feature point storing means 42.

Next, the structure of the data process means 2 will be described in detail. An input figure that is input from the inputting means 1 is stored as a sequence of coordinate points corresponding to a curved line to the figure storing means 41. The feature point calculating means 21 calculates the coordinates of vertexes, the maximum point values and the minimum point values in the horizontal direction and the vertical direction with the sequence of the input coordinate points stored in the figure storing means 41. The calculated results are stored as feature points of the input figure to the feature point storing means 42. The figure stored in the figure storing means 41 and the feature points stored in the feature point storing means 42 are correlated.

The symmetrical axis alternative calculating means 22 calculates symmetrical axis alternatives for determining a symmetry with the feature points stored in the feature point storing means 42. The first determination symmetrical axis determining means 23 extracts the most horizontal symmetrical axis alternative and the most vertical symmetrical axis alternative from the symmetrical axis alternatives calculated by the symmetrical axis alternative calculating means 22.

The first symmetry input point set calculating means 24 calculates sets of input coordinate points for determining whether or not the input figure is symmetrical to each of the symmetrical axis alternatives calculated by the first determination symmetrical axis determining means 23, connects the calculated sets of the input coordinate points with straight lines, and obtains symmetry determination segments.

The first symmetrical axis distance calculating means 25 calculates the distance between the center point of each of the symmetry determination segments and each of the symmetrical axis alternatives. The first symmetry determining means 26 calculates a deviation of the distance between the center point of each of the symmetry determination segments and each of the symmetrical axis alternatives (with an average value, a variance, or the like by a normal distribution function) so as to determine a line symmetry of the input figure.

When the first symmetry determining means 26 has determined that an input figure has a line symmetry, the symmetrizing process means 27 changes the coordinates of the input coordinate points so that the input figure becomes line-symmetrical to the symmetrical axis alternatives. The generated figure is stored in the figure storing means 41 and then output to the outputting means 5.

Next, with reference to FIGS. 1 to 6, the operation of the first embodiment will be described.

Figure 2:
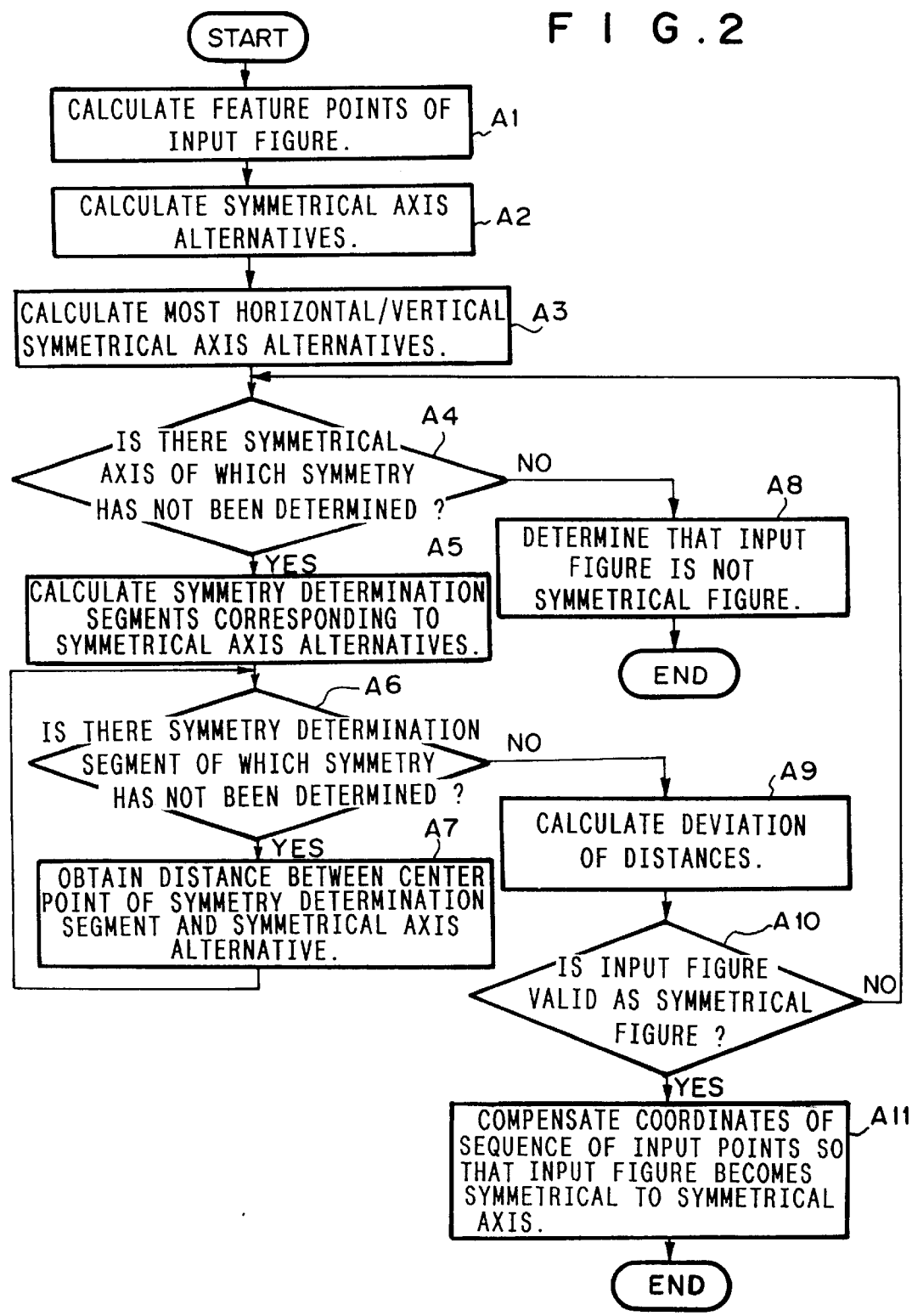
FIG. 2 is a flow chart showing a process of the first embodiment of the present invention.

FIG. 2 is a flow chart showing a process of the second embodiment of the present invention. FIGS. 3a and 3b are schematic diagrams showing an input figure and a shaped figure thereof for explaining the second embodiment. FIG. 4 is a schematic diagram showing examples of symmetrical axis alternatives calculated by the symmetrical axis alternative calculating means 22.

FIG. 5 is a schematic diagram showing examples of a horizontal symmetrical axis alternative and a vertical symmetrical axis alternative extracted by the first determination symmetrical axis determining means 23 from the symmetrical axis alternatives shown in FIG. 4. FIG. 6 is a schematic diagram showing an example of a method for determining a symmetry with symmetry determination segments.

The input figure that is input from the inputting means 1 is stored as a sequence of input coordinate points corresponding to a curved line to the figure storing means 41. The feature point calculating means 21 calculates the coordinates of the vertexes, the maximum point values and the minimum point values in the horizontal direction and the vertical direction with the sequence of the input coordinate points. The calculated results are stored as feature points of the input figure to the feature point storing means 42. The input figure is output to the outputting means 5 (at step A1 shown in FIG. 2).

Next, the symmetrical axis alternative calculating means 22 references the feature points stored in the feature point storing means 42, combines the m-th and (n/2+m)-th feature points (where m=1, 2, . . . ) of the input figure with n feature points (where n=1, 2, . . . ), and outputs for example sets (1, 5), (2, 6), (3, 7), and (4, 8) as symmetrical axis alternatives (at step A2). In the case of an input figure as shown in FIG. 3a, four symmetrical axis alternatives J1 to J4 as shown in FIG. 4 are obtained.

Next, the first determination symmetrical axis determining means 23 extracts the most horizontal symmetrical axis alternative and the most vertical symmetrical axis alternative from all the symmetrical axis alternatives calculated by the symmetrical axis alternative calculating means 22 (see step A3 and FIG. 5).

The following process is performed for one set of the symmetrical axis alternatives. The first symmetry input point set calculating means 24 successively traces input coordinate points on one side of the symmetrical axis alternative from one feature point that intersects with the symmetrical axis alternative to the other. At this point, the first symmetry input point set calculating means 24 places a perpendicular from an input coordinate point traced in the n-th tracing operation (where n=1, 2, . . . ) to the symmetrical axis alternative. At this point, input coordinate points and input coordinate points opposite to the symmetrical axis alternative that intersects with the perpendiculars are treated as sets. Segments that connect these sets are treated as symmetry determination segments (see step A5 and FIG. 6).

Next, the first symmetrical axis distance calculating means 25 calculates the coordinates of the center points (for example C1) of the symmetry determination segments and calculates the distance I1 between the center point of each of the symmetry determination segments and the symmetrical axis alternative (at step A7).

After the first symmetrical axis distance calculating means 25 has performed step A7 for all the symmetry determination segments (at step A6), the first symmetry determining means 26 calculates a deviation of the calculated distance I1 with for example an average or variance.

When the calculated value does not exceed a predetermined threshold value (when the deviation is calculated with the average or variance, the value is reversely proportional to the symmetry), the symmetrical axis alternative is valid as a symmetrical axis of the input figure. In other words, the first symmetry determining means 26 determines that the input figure is line symmetrical to the symmetrical axis alternative (at step A10).

When the first symmetry determining means 26 has determined that the input figure has a line symmetry (namely, when the determined result at step A10 is Yes), the symmetrizing process means 27 vertically compensates the symmetrical axis alternative. Thereafter, the symmetrizing process means 27 compensates the input coordinate points so that the sets of the input coordinate points calculated by the first symmetry input point set calculating means 24 become symmetrical. The resultant input figure is stored in the figure storing means 41. The shaped figure is output to the outputting means 5 (at step A11).

When the first symmetry determining means 26 has determined that the input figure is not symmetrical to the symmetrical axis alternative (namely, when the determined result at step A10 is No), steps A4 to A10 are repeated for the other symmetrical axis alternatives. When the first symmetry determining means has determined that the input figure is not symmetrical to all the symmetrical axis alternatives (namely, when the determined result at step A4 is No), it is determined that the input figure is not a line symmetrical figure (at step A8).

According to the first embodiment of the present invention, line symmetrical axes are automatically extracted from the input curved figure. The input curved figure is shaped to a figure that is line symmetrical to one symmetrical axis.

Next, the operation of the first embodiment of the present invention will be described.

The input figure as shown in FIG. 3a that is input from the inputting unit 1 is stored as a sequence of input coordinate points to the figure storing means 41. The feature point calculating means 21 calculates the coordinates of the vertexes of the input figure, the maximum point values and the minimum point values in the horizontal and vertical directions thereof. The calculated results are stored in the feature point storing means 42. In this embodiment, as shown in FIG. 4, eight feature points are calculated. In addition, the figure as shown in FIG. 3a is output to the outputting means 5.

Next, the symmetrical axis alternative calculating means 22 generates straight lines that connect m-th and (n/2)-th feature points (where n=number of feature points, m=1, 2, . . . ) calculated by the feature point calculating means 21. The generated straight lines are treated as symmetrical axis alternatives. In this embodiment, as shown in FIG. 4, four symmetrical axis alternatives J1 to J4 are calculated. Next, the first determination symmetrical axis determining means 23 calculates the most horizontal symmetrical axis alternative J3 and the most vertical symmetrical axis alternative J1 from the four symmetrical axis alternatives calculated by the symmetrical axis alternative calculating means 22 (see FIG. 5).

Assuming that J1 is a symmetrical axis alternative to be determined, as shown in FIG. 6, the first symmetry input point set calculating means 24 successively traces input coordinate points on the left of the symmetrical axis alternative J1 from a feature point a1 that intersects to J1 to a feature point a2. At this point, perpendiculars are placed from the individual coordinate points to the symmetrical axis alternative J1. Input coordinate points that intersect with the perpendiculars are extracted. Segments that connect the perpendiculars and the input coordinate points are treated as symmetry determination segments. Examples of the symmetry determination segments are T1-t1 and T2-t2 shown in FIG. 6. This process is performed for all the input coordinate points on the left of J1.

Next, the first symmetrical axis distance calculating means 25 obtains the distance between the center point of each of the symmetry determination lines and the symmetrical axis alternative J1. For example, the first symmetrical axis distance calculating means 25 obtains the center point C1 of the symmetry determination segment T3-t3 shown in FIG. 6 and calculates the distance I1 between the center point C1 and the symmetrical axis alternative J1. In this case, the distance I1 is three pixels.

Next, the first symmetry determining means 26 calculates a deviation of the distances obtained by the first symmetrical axis distance calculating means 25. When the deviation is calculated using the average of the distances, if the average does not exceed a predetermined value close to 0 (for example, 5 pixels or less), the first symmetry determining means 26 determines that the input figure is line symmetrical to the symmetrical axis alternative J1. When the calculated average is 2.5, the first symmetry determining means 26 determines that the input figure shown in FIG. 3a is line symmetrical to the symmetrical axis alternative J1.

Next, the symmetrizing process means 27 vertically compensates the symmetrical axis alternative J1 and compensates the coordinates of the sequence of the coordinate points of the input figure so that the symmetrical axis alternative J1 becomes line symmetrical to the compensated symmetrical axis. The resultant figure is stored in the figure storing means 41. At this point, the generated figure is as shown in FIG. 3b. Thus, the figure as shown in FIG. 3a is erased. The figure as shown in FIG. 3b is output to the outputting means 5.

Next, with reference to FIGS. 7 and 8, the operation of the symmetrizing process means 27 will be described. FIG. 7 is a flow chart showing the process of the symmetrizing process means 27. The symmetrizing process means 27 selects a reference of a symmetrical axis and input coordinate points for the symmetrizing process (at step S1). In this example, it is assumed that the reference symmetrical axis and the input coordinate points have been designated by the user.

Next, the symmetrizing process means 27 horizontally or vertically compensates the reference symmetrical axis (at step S2). Thereafter, the symmetrizing process means 27 symmetrically converts each of all the reference input coordinate points with respect to the reference symmetrical axis (at step S3). Next, the symmetrizing process means 27 connects all the reference coordinate points and all the converted coordinate points clockwise or counterclockwise (at step S4).

Figure 8A:
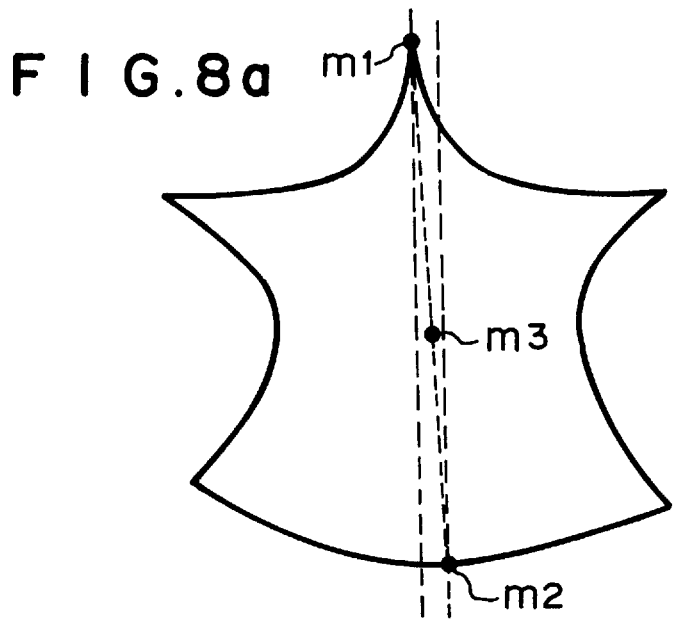
FIGS. 8a, 8b, and 8c are schematic diagrams for explaining a process of the symmetrizing process means 27.

As an example of the process for horizontally /vertically compensating the reference symmetrical axis at step S2, in the case of the vertical axis shown in FIG. 8(a), one of upper point m1, lower point m2, and center point m3 as points of intersection of the symmetrical axis and the input figure is selected. In this case, the user selects one of m1 to m3 beforehand.

In the case of a vertical axis, a reference input coordinate point is selected from input coordinate points on the left (right) side of the symmetrical axis. In the case of a horizontal axis, a reference input coordinate point is selected from input coordinate points on the upper (lower) side of the symmetrical axis. In the case of perpendicular axes, a reference input coordinate point may be selected from input coordinate points of the n-th quadrant (where n=1 to 4).

It is assumed that the reference input coordinate point has been designated by the user.

Figure 8B:
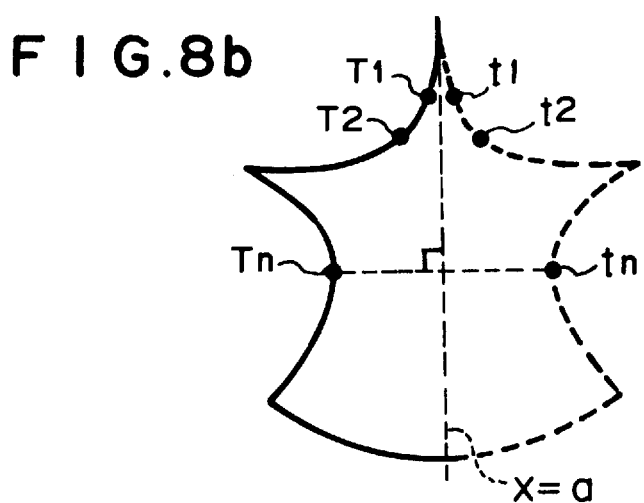

FIG. 8(b) is a schematic diagram for explaining a symmetrizing process for determining a coordinate point tn (xn, yn) on the right side with reference to an input coordinate point Tn (Xn, Yn) on the left side of the symmetrical axis when the symmetrical axis X=a.

In this case, the input coordinate point tn (xn, yn) is obtained by the following equations.

$$xn = 2*a - Xn$$

$$yn = Yn$$

When Tn is obtained with reference to the right side coordinate point tn, the uppercase characters are substituted with the lowercase characters.

[Second Embodiment]

Figure 9:
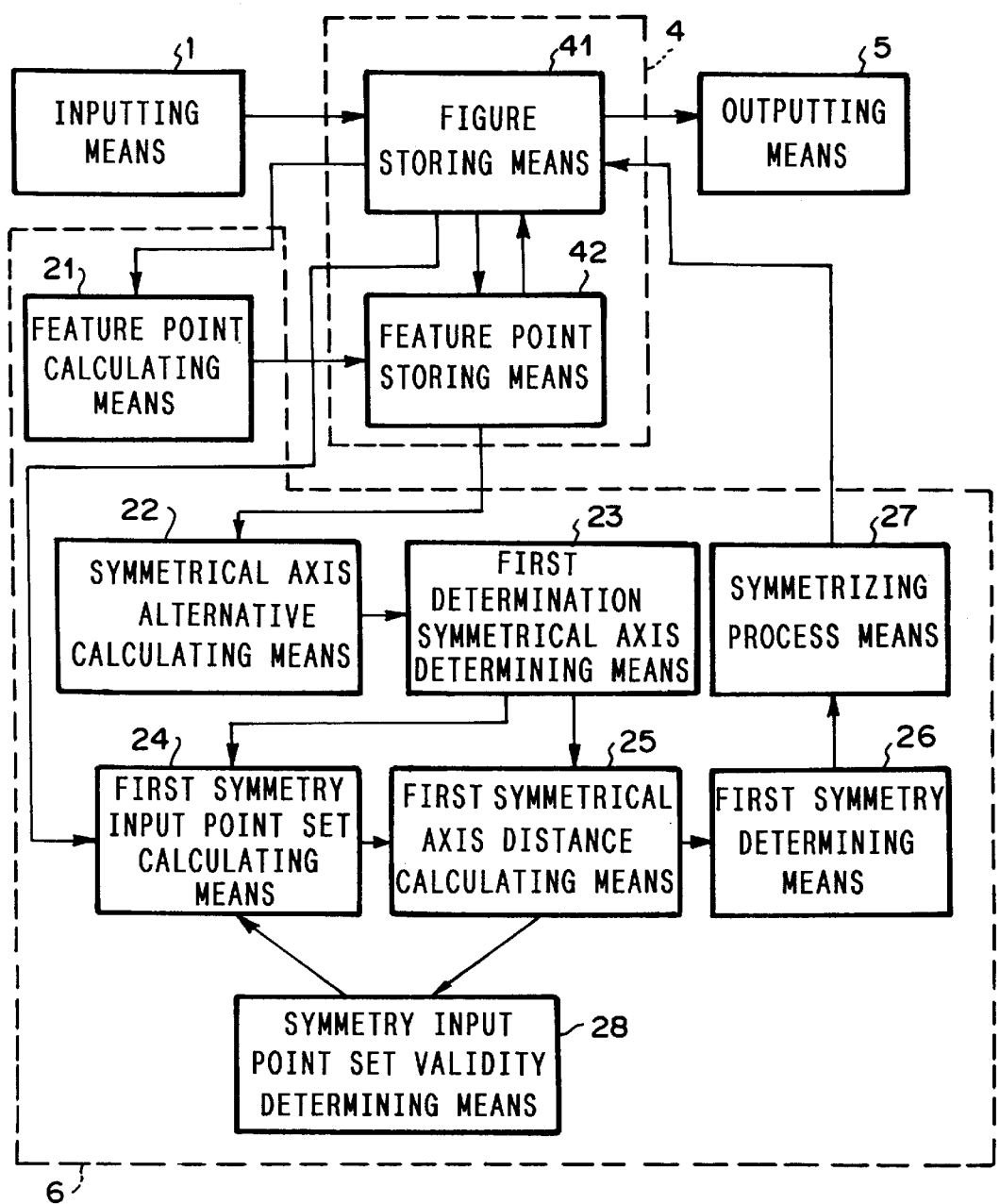
FIG. 9 is a block diagram showing a second embodiment of the present invention.

Next, a second embodiment of the present invention will be described. Referring to FIG. 9, the structure of the second embodiment is different from the structure of the first embodiment in that a data process unit 6 according to the second embodiment has a symmetry input point set validity determining means 28 along with the structure of the data process unit 2 according to the first embodiment shown in FIG. 1.

Figure 10:
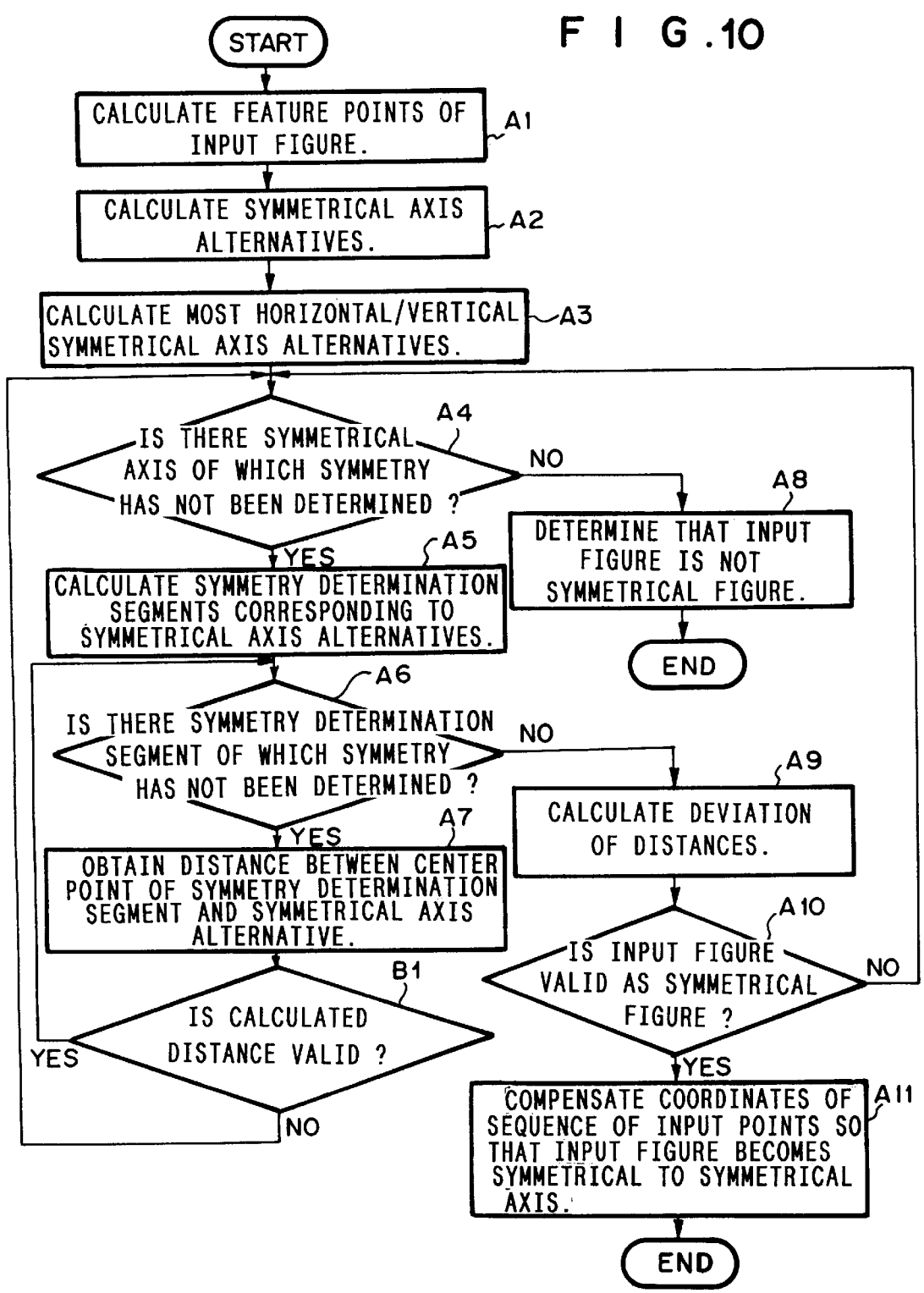
FIG. 10 is a flow chart showing a process of the second embodiment of the present invention.

Next, with reference to FIGS. 9 and 10, the operation of the data process unit 6 according to the second embodiment will be described. FIG. 10 is a flow chart showing the process of the second embodiment.

Since the operations of a feature point calculating means 21, a symmetrical axis alternative calculating means 22, a first determination symmetrical axis determining means 23, a first symmetry input point set calculating means 24, a first symmetrical axis distance calculating means 25, a first symmetry determining means 26, and a symmetrizing process means 27 (at steps A1 to A7, A8, and A9 to A11) according to the second embodiment are the same as those according to the first embodiment shown in FIG. 1, their description is omitted.

In the first embodiment, after the distance between the center points of each of symmetry determination lines and each of symmetrical axis alternatives is calculated, the first symmetry determining means 26 determines whether or not each symmetry axis alternative is valid as a symmetrical axis of the input figure. However, in the second embodiment, after the distance between the center point of one symmetry determination line and each symmetrical axis alternative is calculated, a symmetry input point set validity determining means 28 determines whether or not the calculated distance exceeds a predetermined threshold value.

When the calculated distance is equal to or less than the predetermined threshold value (namely, when the determined result at step B1 is Yes), it is determined that the probability of which the symmetry determination line is symmetrical to the symmetrical axis alternative is high. Thus, the flow returns to step A6. At step A6, a new symmetry determination line is processed.

On the other hand, when the calculated distance exceeds the predetermined threshold value (namely, when the determined result at step B1 is No), it is determined that the input figure is not symmetrical to the symmetrical axis alternative. Thus, the flow returns to step A4. At step A4, a new symmetrical axis alternative is processed (at step B1).

According to the second embodiment, when there is a symmetrical axis alternative that is not symmetrical to the input figure, it is discarded more quickly than the first embodiment. Thus, the process speed of the second embodiment becomes faster than that of the first embodiment.

[Third Embodiment]

Figure 11:
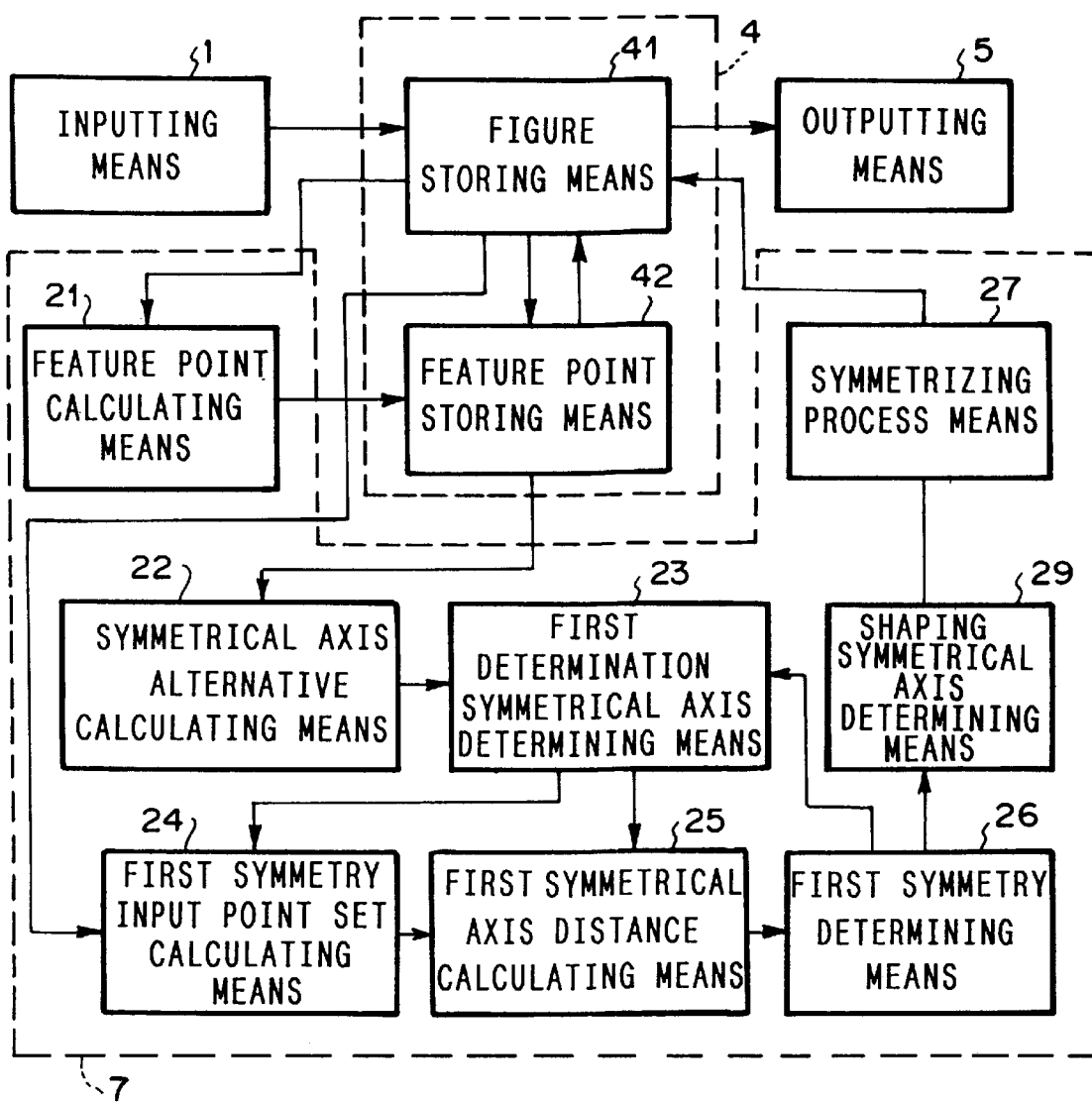
FIG. 11 is a block diagram showing a third embodiment of the present invention.

Next, a third embodiment of the present invention will be described. Referring to FIG. 11, the structure of the third embodiment is different from the structure of the first embodiment in that a data process unit 7 according to the third embodiment has a shaping symmetrical axis determining means 29 along with the structure of the data process unit 2 according to the first embodiment.

Figure 12:
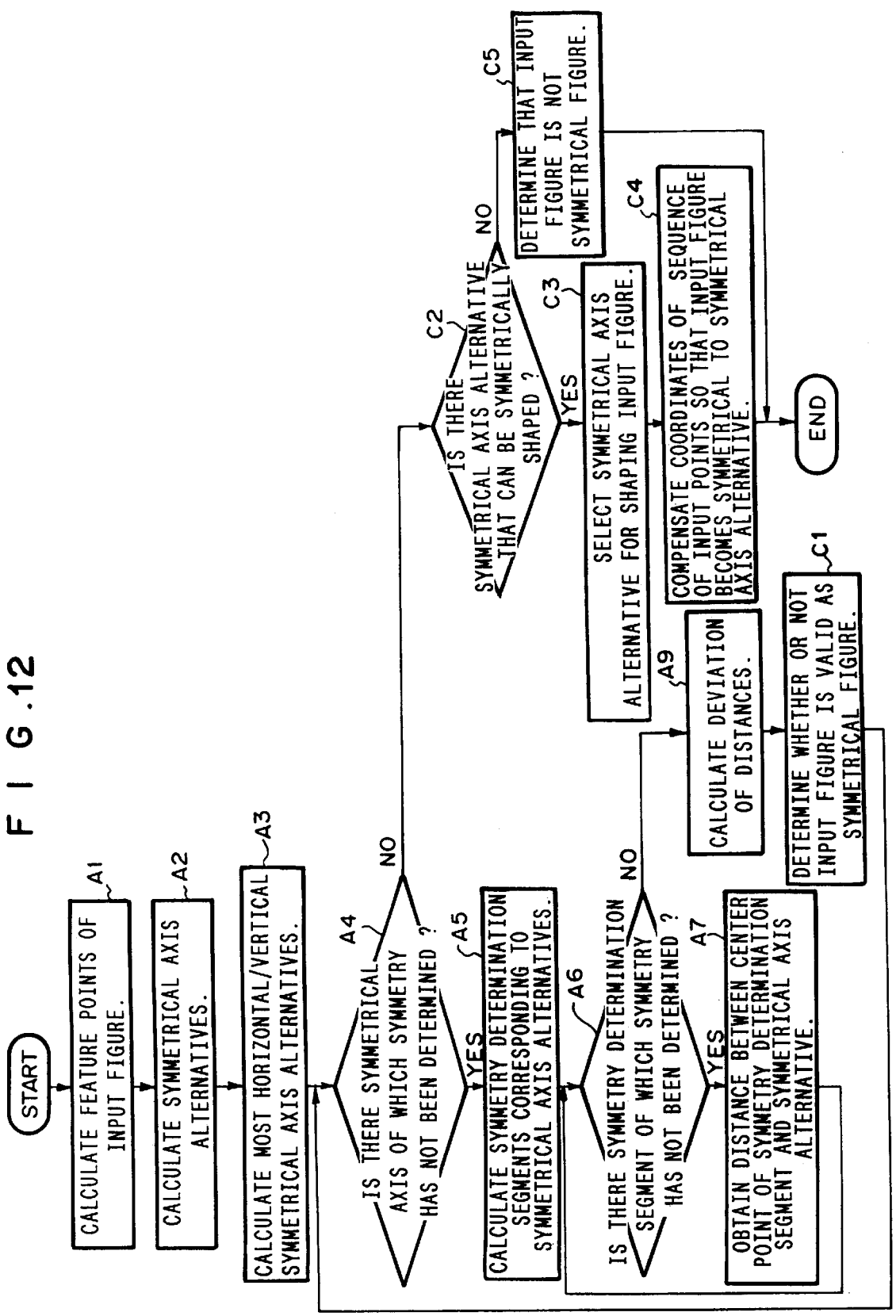
FIG. 12 is a flow chart showing a process of the third embodiment of the present invention.

Next, with reference to FIGS. 11 and 12, the operation of the data process unit 7 according to the third embodiment will be described. FIG. 12 is a flow chart showing the process of the third embodiment.

Since the operations of a feature point calculating means 21, a symmetrical axis alternative calculating means 22, a first determination symmetrical axis determining means 23, a first symmetry input point set calculating means 24, and a first symmetrical axis distance calculating means 25 (at steps A1 to A7 and A9) are the same as the operations of those according to the first embodiment, their description is omitted.

In the first embodiment, when a deviation calculated at step A10 does not exceed the predetermined threshold value, the input figure is line-symmetrically shaped with the symmetrical axis alternatives. However, in the third embodiment, the validity of each symmetrical axis alternative as a symmetrical axis of the input figure is obtained (at step C1). Thereafter, the result is stored in a storing means 4.

After it is determined whether the input figure is line symmetrical to both a horizontal symmetrical axis alternative and a vertical symmetrical axis alternative (at step A4), when there is a valid symmetrical axis alternative as a symmetrical axis of the input figure, a shaping symmetrical axis determining means 29 determines a symmetrical axis alternative as a symmetrical axis of the input figure (at step C2). Such a symmetrical axis is determined by the user or by selecting a symmetrical axis alternative that has the highest symmetry to the input figure (at step C3).

Thereafter, a symmetrizing process means 27 compensates the coordinates of the input coordinate points of the input figure so that the input figure becomes line symmetrical to the determined symmetrically axis alternative (at step C4).

When there is no valid symmetrical axis alternative as a symmetrical axis (namely, when the determined result at step C2 is No), it is determined that the input figure is not a line symmetrical figure (at step C5).

According to the third embodiment, when both horizontal and vertical symmetrical axis alternatives are valid as symmetrical axes of the input figure, one of these symmetrical axis alternatives can be selected. Thus, the shaped result corresponding to the intention of the user can be obtained. Alternatively, a line symmetrical figure shaped most similar to the input figure can be obtained.

[Fourth Embodiment]

Figure 13:
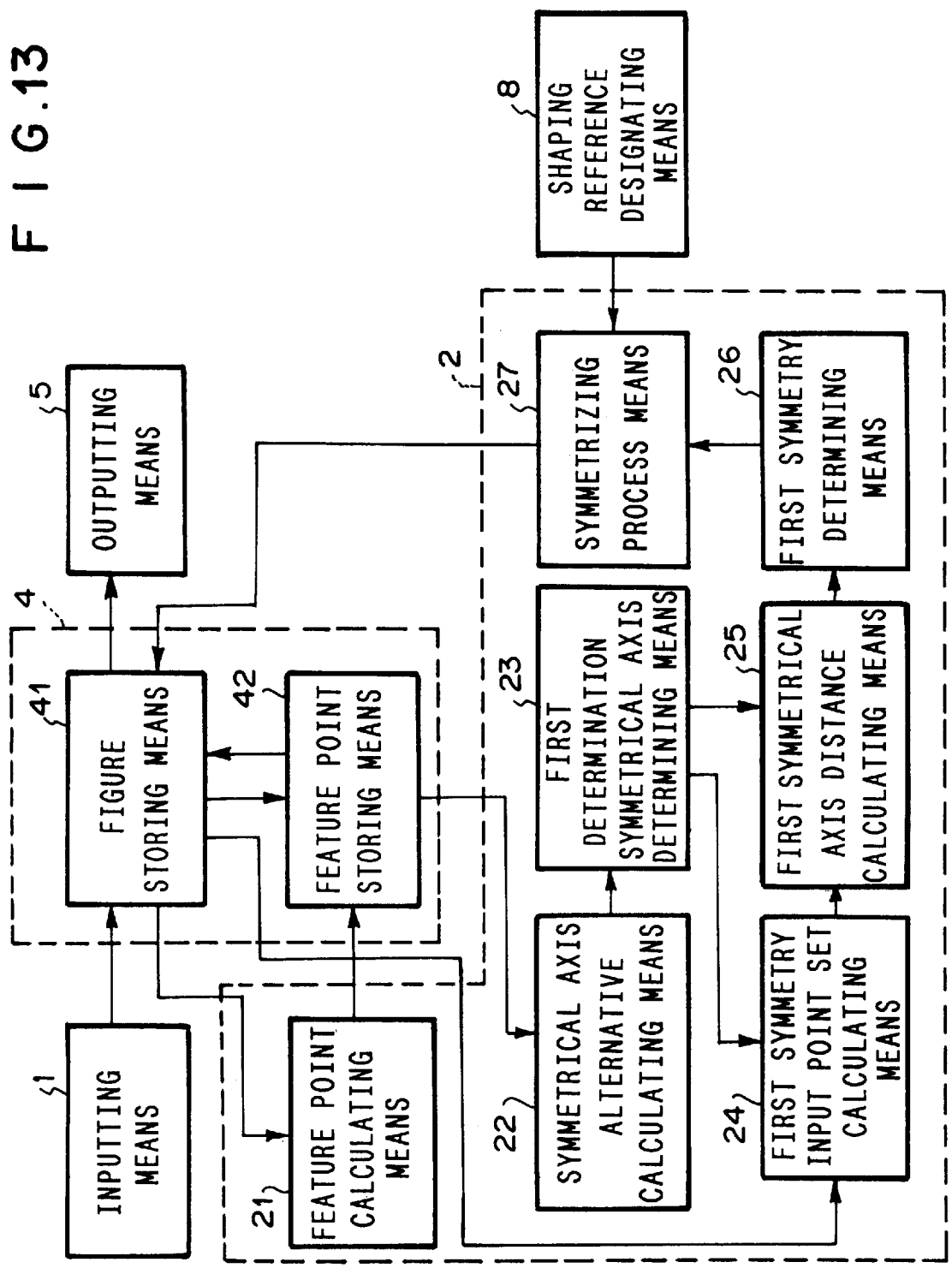
FIG. 13 is a block diagram showing a process of a fourth embodiment of the present invention.

Next, a fourth embodiment of the present invention will be described. Referring to FIG. 13, the structure of the fourth embodiment is different from the structure of the first embodiment in that the structure according to the fourth embodiment has a shaping reference designating means 8 along with the structure according to the first embodiment shown in FIG. 1.

Figure 14:
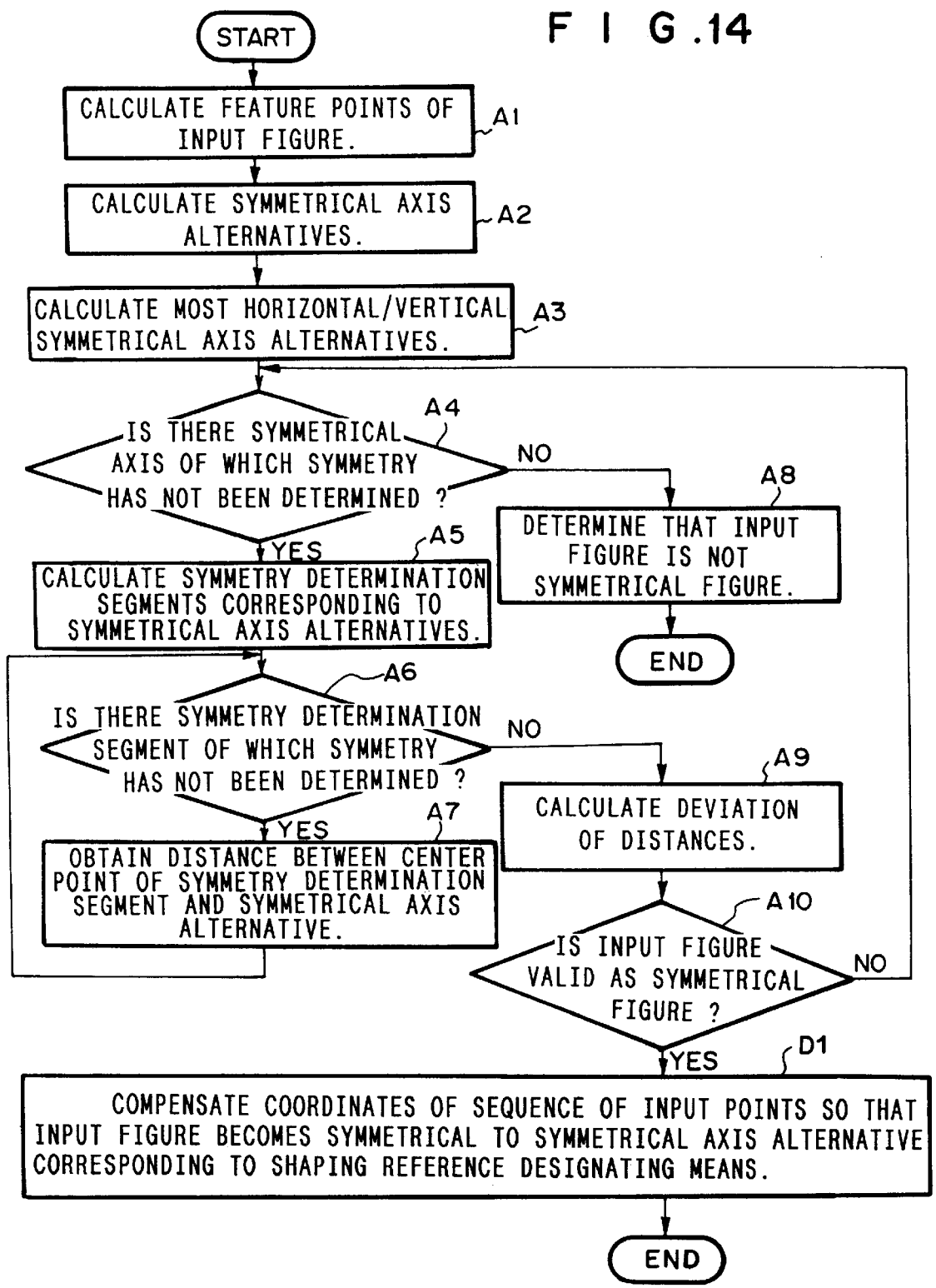
FIG. 14 is a flow chart showing a process of the fourth embodiment of the present invention.

Next, with reference to FIGS. 13 and 14, the operation of the fourth embodiment will be described. FIG. 14 is a flow chart showing the process of the fourth embodiment of the present invention.

Since the operations of a feature point calculating means 21, a symmetrical axis alternative calculating means 22, a first determination symmetrical axis determining means 23, a first symmetry input point set calculating means 24, a first symmetrical axis distance calculating means 25, and a first symmetry determining means 26 (at steps A1 to A7, A8, A9, and A10) are the same as those according to the first embodiment, their description is omitted.

When the first symmetry determining means 26 has determined that the input figure is a line symmetrical figure, a shaping reference designating means 8 designates a reference element for shaping the input figure or an element to be referenced. For example, as explained in FIG. 8a, as methods for designating the position of a reference symmetrical axis, (1) In the case of a vertical axis, one of points of intersection (upper, middle, lower) of a symmetrical axis and the input figure is designated.

(2) In the case of a horizontal axis, one of points of intersection (left, middle, right) of a symmetrical axis and the input figure is designated.

As methods for designating a reference input coordinate points, as shown in FIG. 8b, (1) In the case of a vertical axis, an input coordinate point on the left/right of a symmetrical axis is designated.

(2) In the case of a horizontal axis, an input coordinate point on the upper/lower side of a symmetrical axis is designated.

(3) In the case of perpendicular axes, input coordinates of both the symmetrical axes in the n-th quadrant are designated.

Figure 8C:
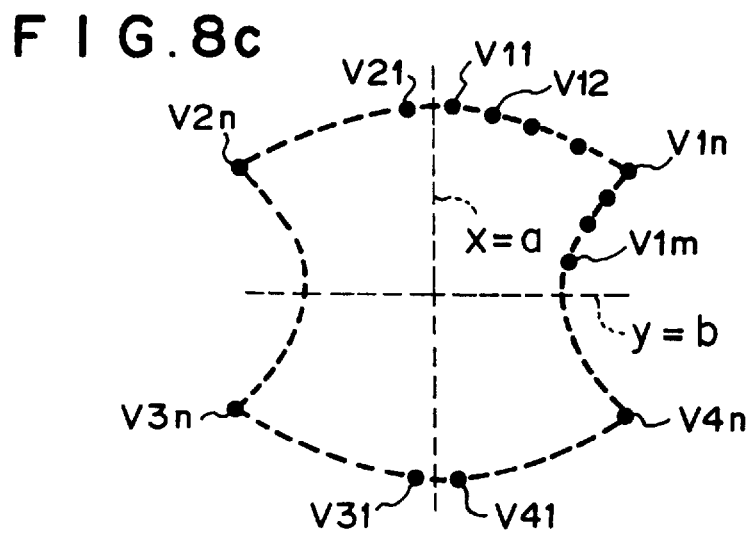

In the example shown in FIG. 8c, with reference to input coordinates V11 to V1m in the first quadrant that perpendicular axes x=a and y=b form, input coordinates in the second to fourth quadrants are generated. The symmetrizing process means 27 symmetrically shapes the input figure corresponding to the contents designated by the shaping reference designating means 8 (at step D1).

According to the fourth embodiment of the present invention, since each input coordinate point and each element for referencing the position of a symmetrical axis can be designated from the outside, a line symmetrical figure corresponding to the intention of the user can be input.

[Fifth Embodiment]

Next, a fifth embodiment of the present invention will be described. FIG. 15 is a block diagram showing the fifth embodiment of the present invention. Referring to FIG. 15, the fifth embodiment comprises an inputting means 1, a data process unit 9, a storing means 4, and an outputting means 5. The inputting means 1 inputs a figure with for example a keyboard, a mouse, and/or a pen. The data process unit 9 is controlled corresponding to a program. The storing means 4 stores figure information and feature points. The outputting means 5 outputs data with for example a display unit and a printer.

The data process unit 9 comprises a feature point calculating means 21, a symmetrical axis alternative calculating means 22, a vertically symmetrical axis alternative determining means 30, a horizontally symmetrical axis alternative determining means 31, a perpendicularly symmetrical axis determining means 32, a first symmetry input point set calculating means 24, a first symmetrical axis distance calculating means 25, a first symmetry determining means 26, a second symmetry input point set calculating means 33, a second symmetrical axis distance calculating means 34, a second symmetry determining means 35, and a perpendicular axis symmetrizing process means 36.

The storing means 4 comprises a figure storing means 41 and a feature point storing means 42.

Next, the structure of the data process means 9 will be described in detail. An input figure that is input from an inputting means 1 is stored as a sequence of coordinate points corresponding to a curved line to a figure storing means 41. The feature point calculating means 21 calculates the coordinates of vertexes, the maximum point values and the minimum point values in the horizontal and vertical directions with the sequence of the input coordinate points stored in the figure storing means 41. The calculated results are stored as feature points of the input figure to a feature point storing means 42. The figure stored in the figure storing means 41 and the feature points stored in the feature point storing means 42 are correlated.

The symmetrical axis alternative calculating means 22 calculates symmetrical axes for determining a symmetry of the input figure with the feature points stored in the feature point storing means 42. The vertically symmetrical axis alternative determining means 30 extracts the most vertical symmetrical axis alternative from all the symmetrical axis alternatives calculated by the symmetrical axis alternative calculating means 22.

The horizontally symmetrical axis alternative determining means 31 extracts one symmetrical axis alternative that will become a horizontally symmetrical axis alternative from the symmetrical axis alternatives extracted by the vertically symmetrical axis alternative determining means 30 in all the symmetrical axis alternatives calculated by the symmetrical axis alternative calculating means 22.

The perpendicularly symmetrical axis determining means 32 determines whether or not the two symmetrical axis alternatives extracted by the vertically symmetrical axis alternative determining means 30 and the horizontally symmetrical axis determining means 31 are perpendicular to each other.

When the perpendicularly symmetrical axis determining means 32 has determined that the two symmetrical axis alternatives are perpendicular to each other, the first symmetry input point set calculating means 24 calculates sets of input coordinate points for determining a symmetry of the input figure to the vertically symmetrical axis alternative and connects the sets of the calculated input coordinate points with straight lines. Thus, symmetry determination segments are obtained.

The first symmetrical axis distance calculating means 25 calculates the distance between the center point of each of the symmetry determination segments and the symmetrical axis alternative. The first symmetry determining means 26 calculates a deviation of the distances so as to determine whether or not the input figure is line symmetrical to the vertically symmetrical axis alternative.

The second symmetry input point set calculating means 33, the second symmetrical axis distance calculating means 34, and the second symmetry determining means 35 perform the same processes as the vertical symmetrical axis alternative for the horizontally symmetrical axis alternative extracted by the horizontally symmetrical axis alternative determining means 31.

When it has been determined that the input figure is symmetrical to both the vertically symmetrical axis alternative and the horizontally symmetrical axis alternative, the perpendicular axis symmetrizing process means 36 changes the coordinates of the input points of the input figure so that the input point becomes line symmetrical to both the symmetrical axis alternatives. The resultant figure is stored in the figure storing means 41 and then output to an outputting means 5.

Next, with reference to FIGS. 15 to 20, the operation of the fifth embodiment of the present invention will be described.

Figure 16:
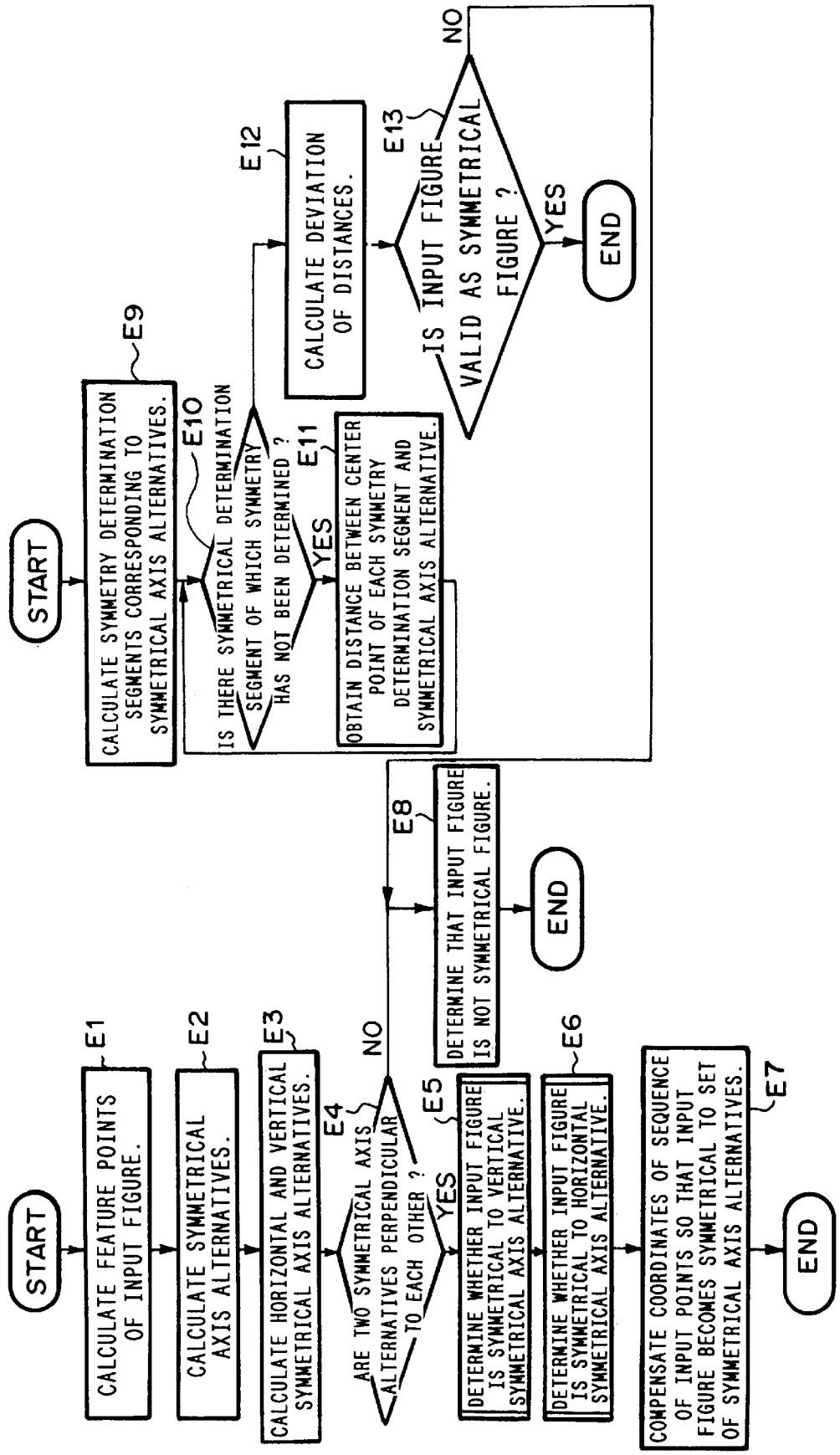
FIG. 16 is a flow chart showing a process of the fifth embodiment of the present invention.
Figure 19:
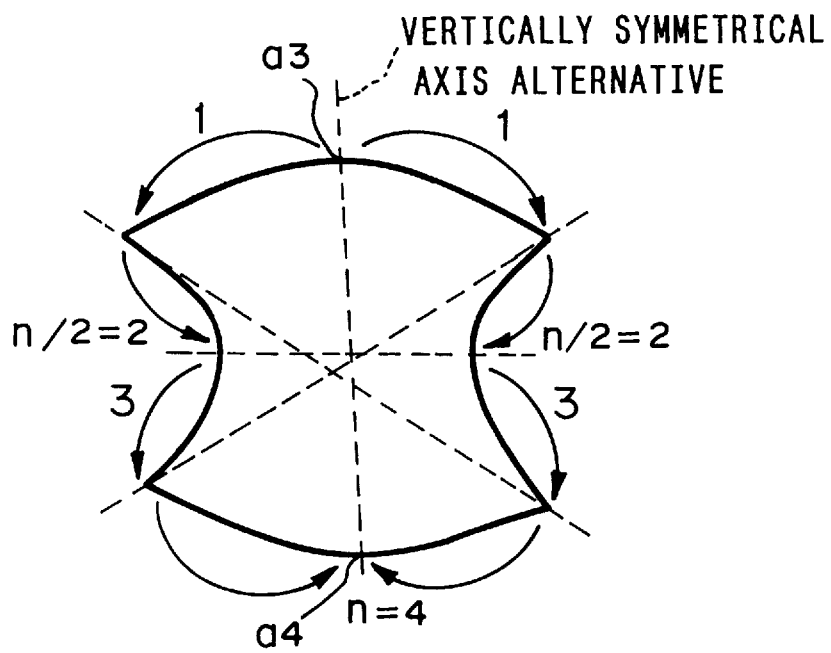
FIG. 19 is a schematic diagram showing an example of a process for determining a horizontal symmetrical axis alternative from vertical symmetrical axis alternatives extracted by a vertical symmetrical axis alternative determining means 30 in the symmetrical axis alternatives shown in FIG. 18.
Figure 20:
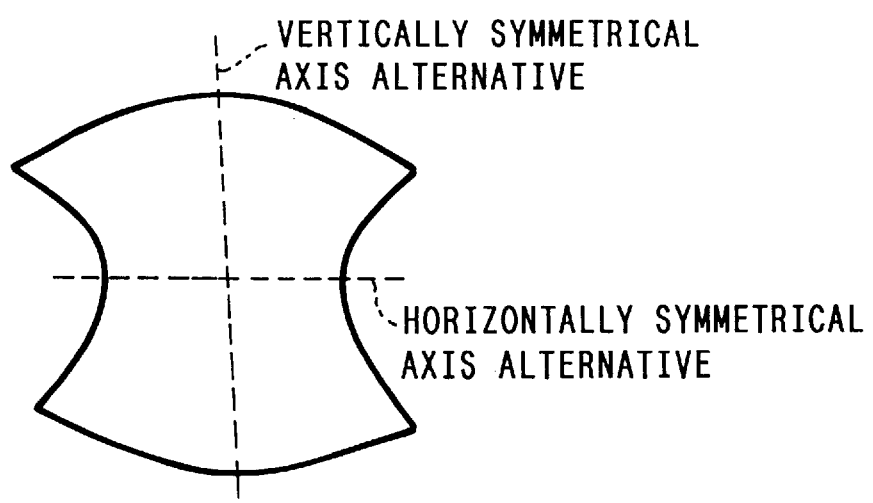
FIG. 20 is a schematic diagram showing examples of a horizontal symmetrical axis alternative and a vertical symmetrical axis alternative extracted by the vertical symmetrical axis alternative determining means 30 and a horizontal symmetrical axis alternative determining means 31.

FIG. 16 is a flow chart showing the process of the fifth embodiment of the present invention. FIGS. 17a and 17b are schematic diagrams showing an input figure and a shaped figure thereof for explaining the fifth embodiment of the present invention. FIG. 18 is a schematic diagram showing examples of symmetrical axis alternatives calculated by the symmetrical axis alternative calculating means 22. FIG. 19 is a schematic diagram showing a process for determining a horizontally symmetrical axis alternative from vertically symmetrical axis alternatives extracted by the vertically symmetrical axis alternative determining means 30 in the symmetrical axis alternatives shown in FIG. 18. FIG. 20 is a schematic diagram showing a horizontally symmetrical axis alternative and a vertically symmetrical axis alternative extracted by the vertically symmetrical axis alternative determining means 30 and the horizontally symmetrical axis alternative determining means 31 from the symmetrical axis alternatives shown in FIG. 18.

An input figure that is input from an inputting means 1 is stored as a sequence of input coordinate points corresponding to a curved line to the figure storing means 41. The feature point calculating means 21 calculates the coordinates of vertexes, the maximum point values and the minimum point values in the horizontal and vertical directions with the sequence of input coordinate points. The calculated results are stored as feature points of the input figure to the feature point storing means 42. The resultant figure is output to the outputting means 5 (see FIG. 14 and step E1 of FIG. 16).

Next, the symmetrical axis alternative calculating means 22 references the feature points stored in the feature point storing means 42 and combines m-th and (n/2+m)-th feature points (where m=1, 2, . . . ) of the input figure with n feature points as symmetrical axis alternatives (at step E2). In the case of an input figure as shown in FIG. 17a, four symmetrical axis alternatives J5 to J8 as shown in FIG. 18 are calculated.

Next, the vertically symmetrical axis alternative determining means 30 extracts the most vertically symmetrical axis alternative J5 from all the symmetrical axis alternatives calculated by the symmetrical axis alternative calculating means 22. Next, the horizontally symmetrical axis alternative determining means 31 extracts the horizontally symmetrical axis alternative J7 from the vertically symmetrical axis alternatives extracted by the vertically symmetrical axis alternative determining means 30.

In the case of an input figure as shown in FIG. 17*b*, assuming that a straight line that extends from a feature point a3 to a feature point a4 is a vertically symmetrical axis alternative, the horizontally symmetrical axis alternative determining means 31 traces feature points on both the sides of the vertically symmetrical axis alternative from the one feature point (a3) to the other feature point (a4). When the number of the feature points is n (where n is an integer), a straight line that connects each (n/2) point is treated as a horizontally symmetrical axis alternative. In the case of the input figure as shown in FIG. 17*b*, a set of symmetrical axis alternatives as shown in FIG. 20 is calculated (at step E3).

Next, the perpendicularly symmetrical axis determining means 32 calculates the angle of the set of the two symmetrical axes. Unless the angle is a predetermined value close to 90°, the perpendicularly symmetrical axis determining means 32 determines that the set of the symmetrical axis alternatives do not become perpendicular axes. Thus, the perpendicularly symmetrical axis determining means 32 determines that the input figure is not symmetrical to the perpendicularly symmetrical axes (at steps E4 and E8).

When the perpendicularly symmetrical axis determining means 32 has determined that the set of the symmetrical axis alternatives are perpendicular to each other (namely, when the determined result at step E4 is Yes), it is determined whether or not the input figure is symmetrical to the vertically symmetrical axis alternative (at step E5).

Since the operations (at steps E9 to E13) of the first symmetry input point set calculating means 24, the first symmetrical axis distance calculating means 25, and the first symmetry determining means 26 that determine the symmetry of the input figure are the same as the operations (at steps A5 to A10 shown in FIG. 2) of those of the first embodiment, their description is omitted.

When it has been determined that the vertical symmetrical axis alternative is valid as a symmetrical axis of the input figure, the second symmetry input point set calculating means 33, the second symmetrical axis distance calculating means 34, and the second symmetry determining means 35 determine the validity of the horizontally symmetrical axis alternative as a symmetrical axis of the input figure (at step E6).

When the first symmetry determining means 26 and the second symmetry determining means 35 have determined that the set of the symmetrical axis alternatives are valid as symmetrical axes of the input figure, the perpendicular axis symmetrizing process means 36 vertically and horizontally compensates the vertically symmetrical axis alternative and the horizontally symmetrical axis alternative, respectively. Thereafter, the perpendicular axis symmetrizing process means 36 compensates the input coordinate points of the input figure so that the set of the input coordinate points of the input figure becomes line symmetrical to both the perpendicularly symmetrical axes. The compensated results are stored in the figure storing means 41. The shaped figure is output to the outputting means 5 (see step E7 of FIG. 16 and FIG. 15(*b*)).

According to the fifth embodiment, perpendicularly symmetrical axes are automatically extracted from a curved line figure that is input by the user. The input figure can be shaped so that it becomes line symmetrical to both perpendicularly symmetrical axes.

Figure 21:
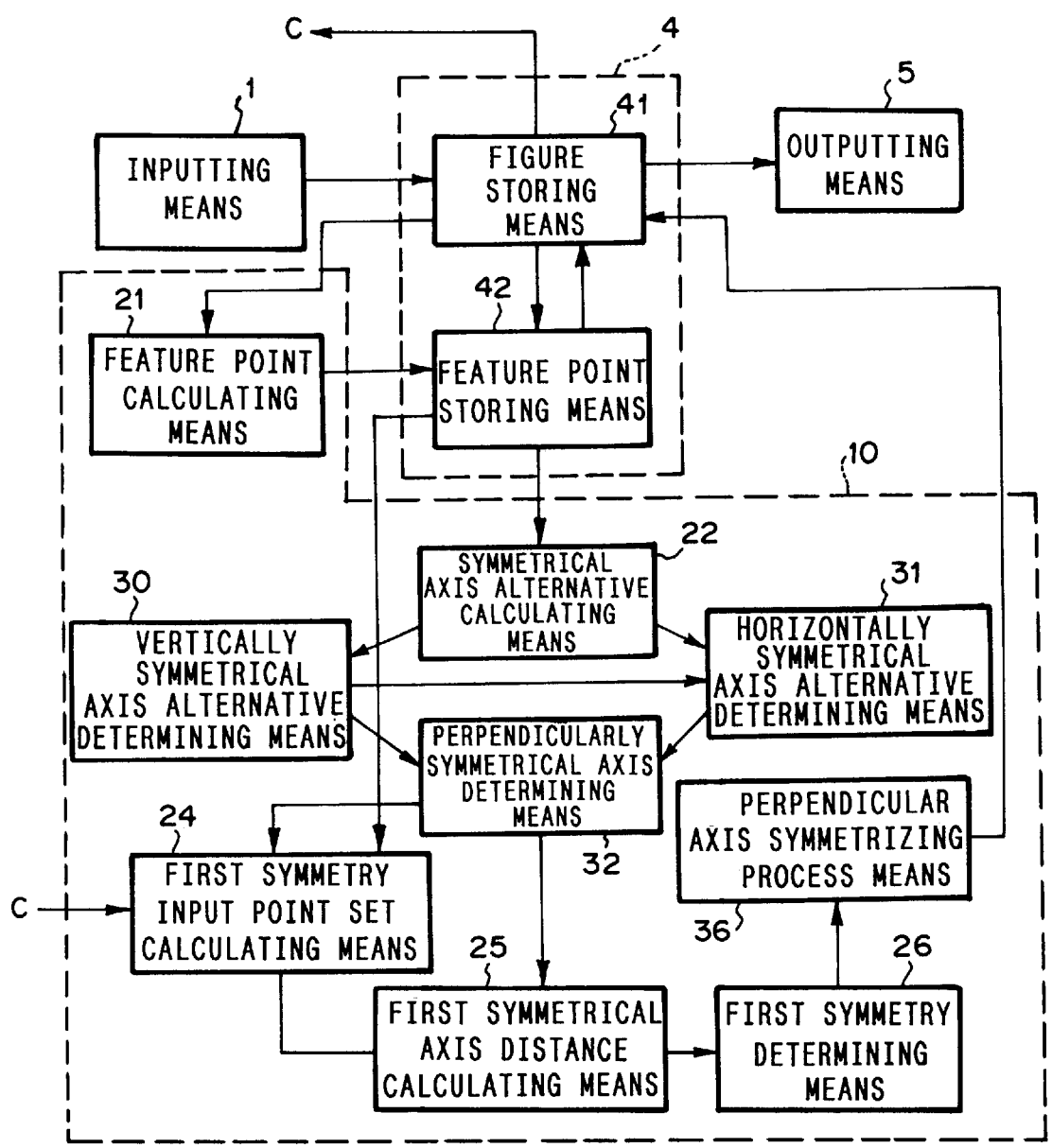
FIG. 21 is a block diagram showing a modification of the fifth embodiment of the present invention.

In a modification of the fifth embodiment, since the operation at step E5 is similar to the operation at step E6 as shown in FIG. 16, a first symmetry input point set calculating means 24, a first symmetrical axis distance calculating means 25, and a first symmetry determining means 26 determine the validity of a vertically symmetrical axis alternative and a horizontally symmetrical axis alternative as symmetrical axes of the input figure as shown in FIG. 21.

According to the modification of the fifth embodiment, the apparatus can be more simplified than the structure of the fifth embodiment. Thus, the memory can be effectively used.

[Sixth Embodiment]

Figure 22:
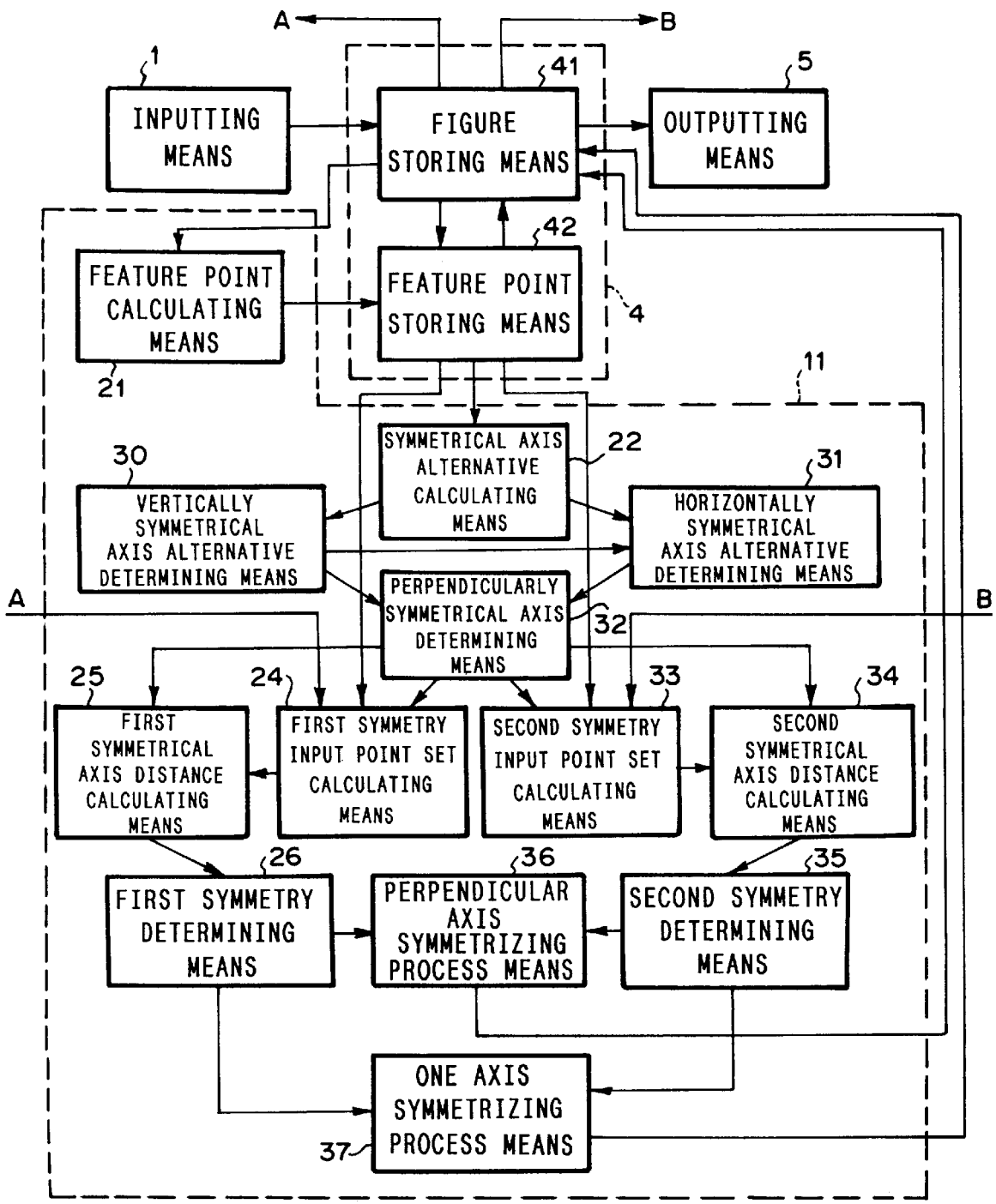
FIG. 22 is a block diagram showing a sixth embodiment of the present invention.

Next, a sixth embodiment of the present invention will be described. Referring to FIG. 22, the structure of the sixth embodiment of the present invention is different from the structure of the fifth embodiment in that a data process unit 11 according to the sixth embodiment has a one axis symmetrizing process means 37 along with the structure of the data process unit 9 according to the fifth embodiment shown in FIG. 13.

Figure 23A:
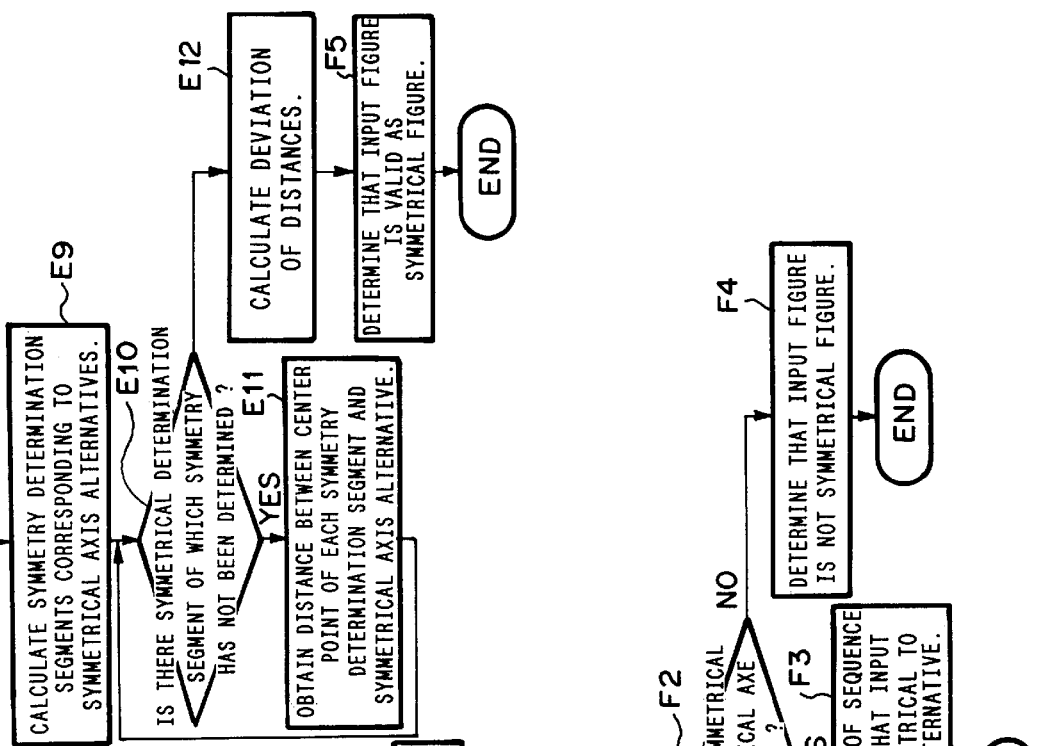
FIGS. 23a and 23b are flow charts showing a process of the sixth embodiment.
Figure 23B:
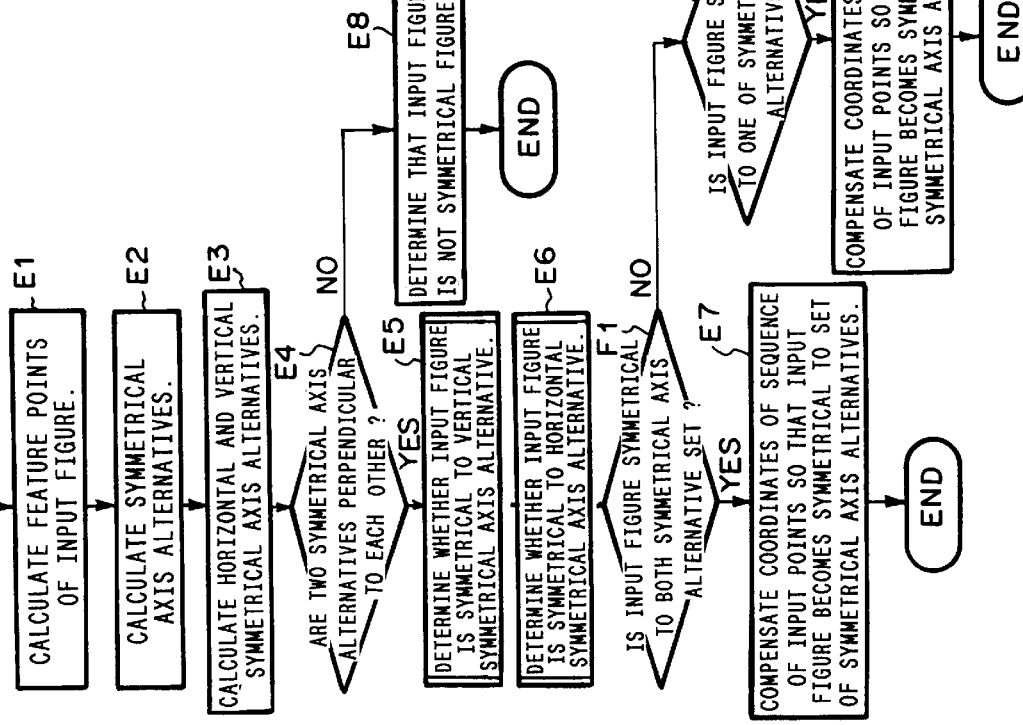
Figure 24:
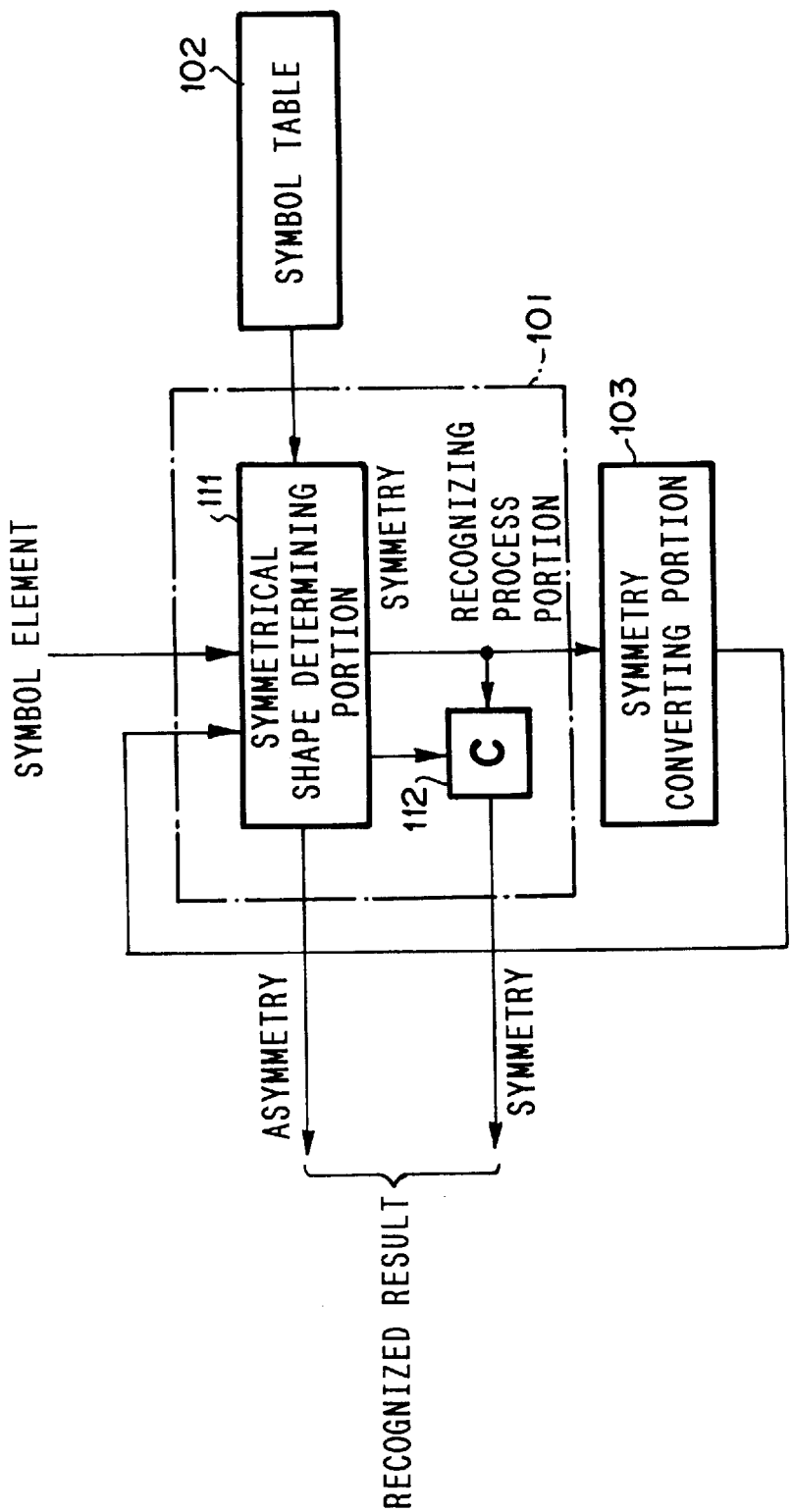
FIG. 24 is a block diagram showing a first prior art reference.
Figure 25:
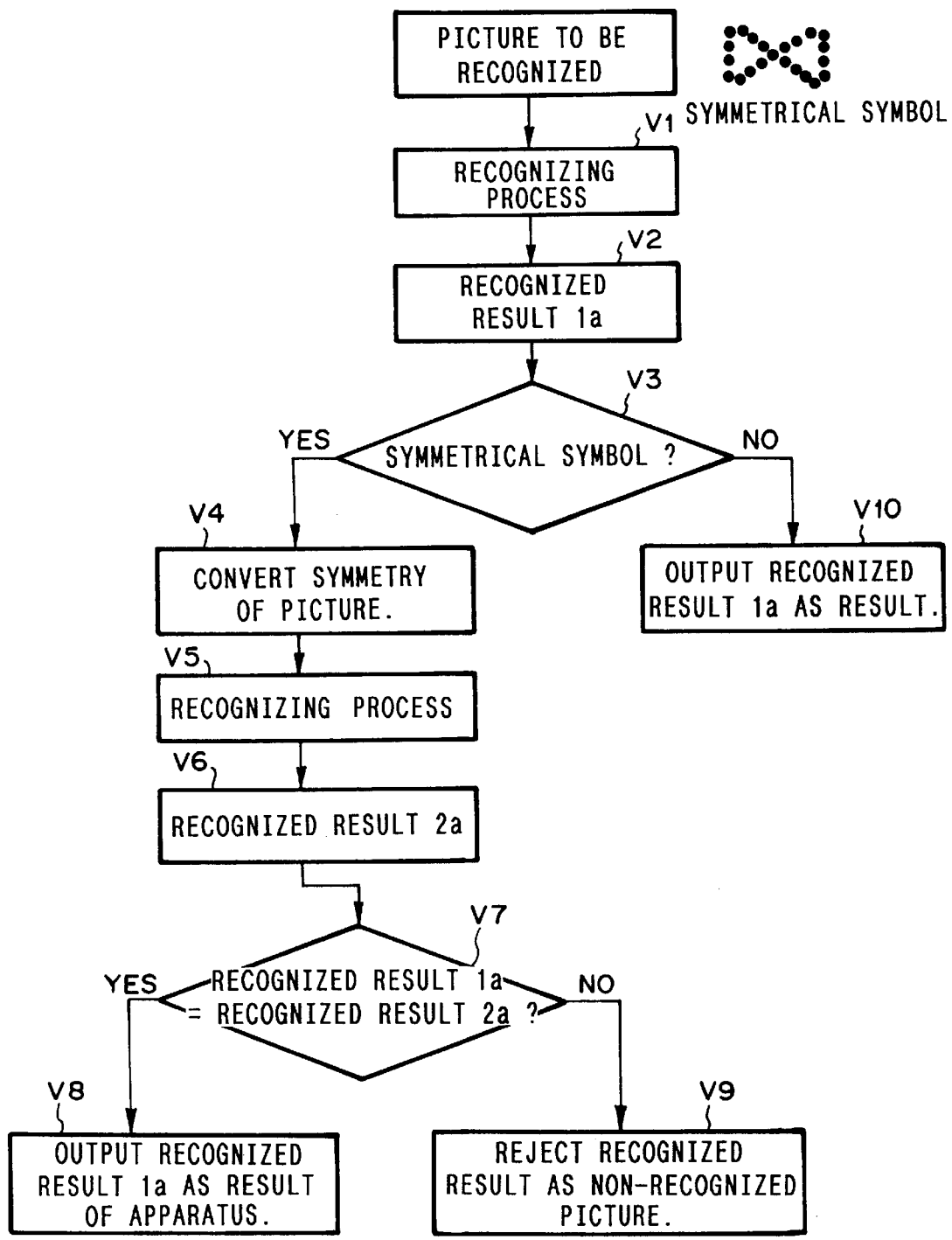
FIG. 25 is a flow chart showing a process of the first related art reference.
Figure 26:
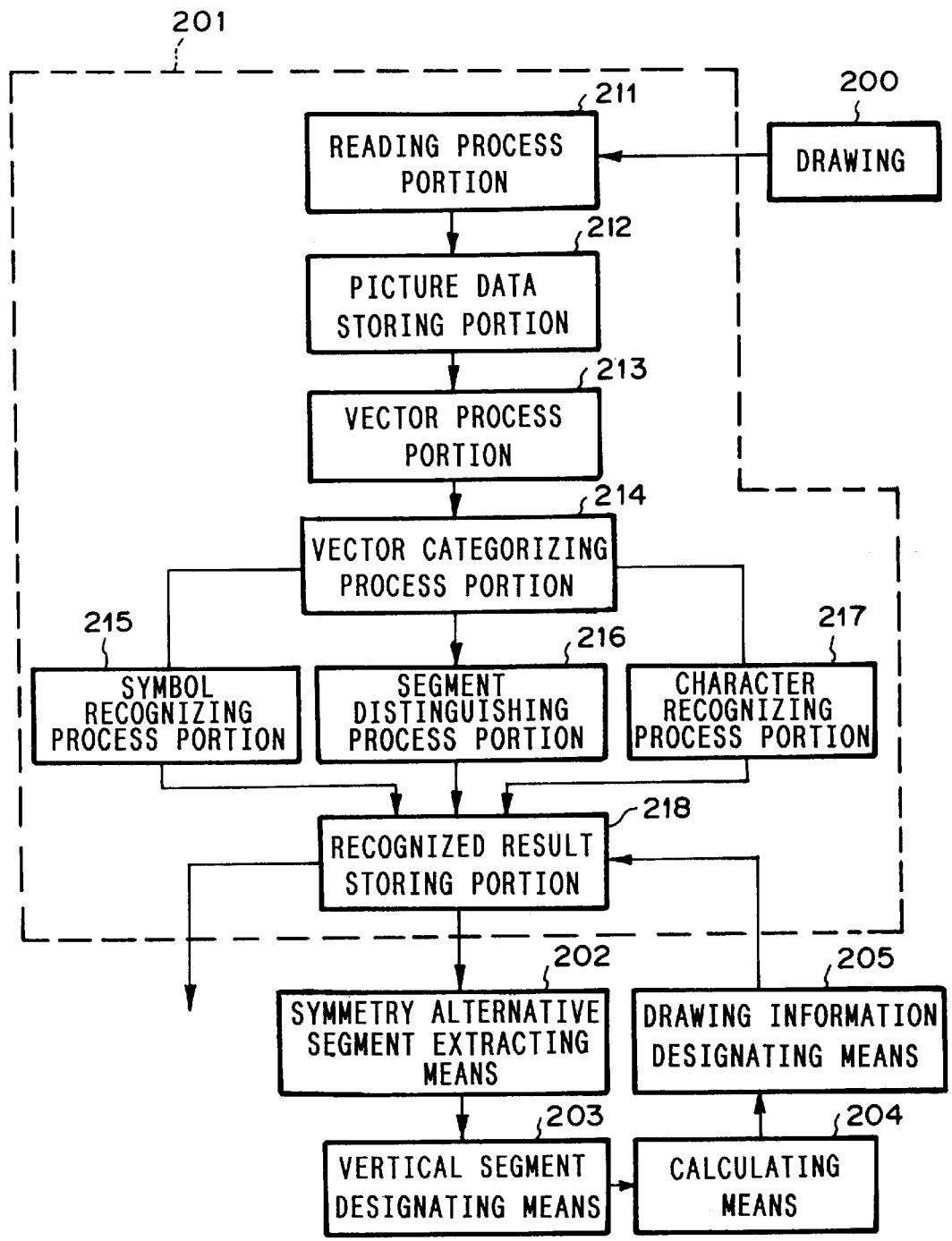
FIG. 26 is a block diagram showing a second related art reference.
Figure 27:
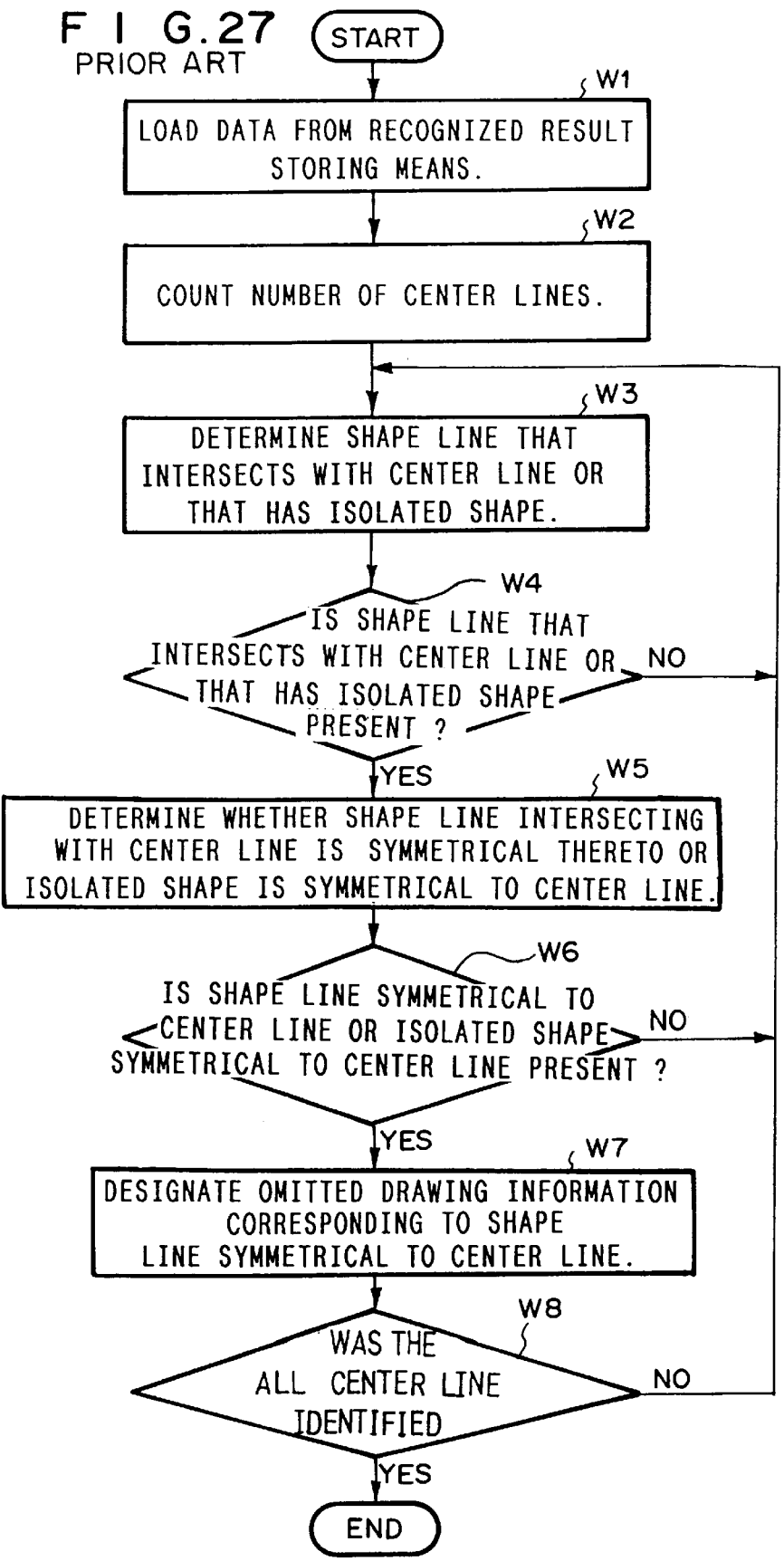
FIG. 27 is a flow chart showing a process of the second prior art reference.
Figure 28:
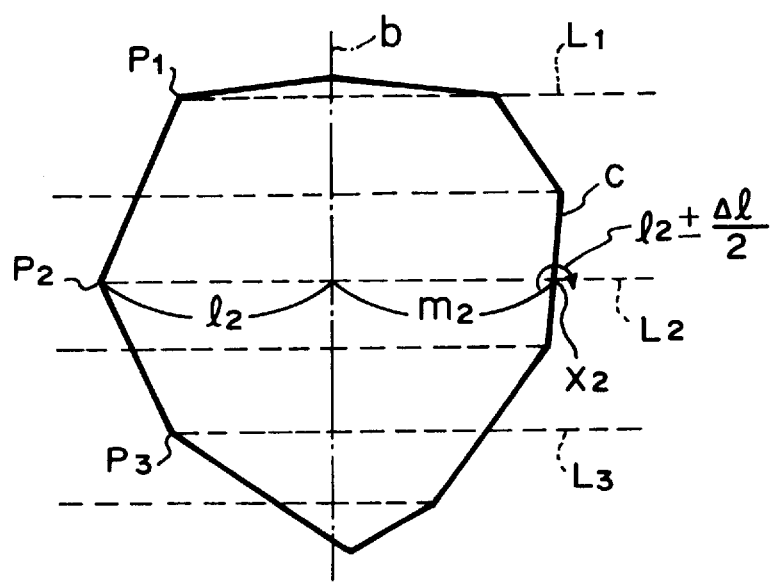
FIG. 28 is a schematic diagram for explaining a method for determining a symmetry of a shape line that intersects with a center line according to the second related art reference.

Next, with reference to FIGS. 22, 23*a* and 23*b*, the operation of the sixth embodiment will be described. FIGS. 23*a* and 23*b* are flow charts showing the process of the sixth embodiment.

Since the operations of a feature point calculating means 21, a symmetrical axis alternative calculating means 22, a vertically symmetrical axis alternative determining means 30, a horizontally symmetrical axis alternative determining means 31, a perpendicularly symmetrical axis determining means 32, a first symmetry input point set calculating means 24, a first symmetrical axis distance calculating means 25, a second symmetry input point set calculating means 33, and a second symmetrical axis distance calculating means 34 (at steps E1 to E6, E7, E8, and E9 to E12 shown in FIGS. 23*a* and 23*b*) according to the sixth embodiment are the same as those according to the fifth embodiments, their description is omitted.

The validity of the vertically symmetrical axis alternative and the horizontally symmetrically axis alternative calculated by a first symmetry determining means 26 and a second symmetry determining means 35 is stored in a storing means 4 (at step F5).

After the validity of the symmetrical axes of the input figure has been calculated, when both the symmetrical axes are valid as symmetrical axes of the input figure, a perpendicular axis symmetrizing means 36 symmetrizes the perpendicular axes (at step F1). When one of symmetrical axes alternatives is not valid, the one axis symmetrizing process means 37 determines whether or not one of them is valid as a symmetrical axis of the input figure (at step F2). When there is a valid symmetrical axis, the one axis symmetrizing process means 37 symmetrizes the symmetrical axis alternative.

According to the sixth embodiment, even if an input figure is not symmetrical to both perpendicular axes, when the input figure is line symmetrical to one of them, the symmetrizing process is performed. Thus, the probability of which the input figure is shaped is increased.

By adding two or more units according to the second, third, or fourth embodiment to the unit according to the first embodiment, a complex effect can be obtained. Likewise, the unit according to the second or fourth embodiment can be added to the unit according to the fifth or sixth embodiment.

As a first effect of the present invention, a horizontally or vertically line symmetrical axis is automatically extracted from a curved figure that the user has input. A figure that is line symmetrically shaped can be obtained.

In other words, a deviation of the distance between the center point of each symmetry determination segment generated by the first symmetry input point set calculating means and each symmetrical axis alternative extracted by the symmetrical axis alternative calculating means is calculated. Thus, it is determined whether or not the input figure is symmetrical to each symmetrical axis alternative. When the input figure is symmetrical to a symmetrical axis alternative, the input figure is shaped so that it becomes line symmetrical to the symmetrical axis alternative.

As a second effect of the present invention, since symmetrical axis alternatives that do not have a symmetry of the input figure can be quickly discarded, the input figure can be processed at high speed.

In other words, the symmetry input point set validity determining means determines the validity of each symmetrical axis alternative corresponding to each symmetry determination segment. When it has been determined that each symmetry determination segment does not have a symmetry to each symmetry axis alternative, the symmetry input point set validity determining means determines that the symmetrical axis alternative is not a valid symmetrical axis alternative to the input figure.

As a third effect of the present invention, when a plurality of symmetrical axis alternatives are valid as a symmetrical axis of the input figure, the user can select one of the symmetrical axis alternatives for shaping the input figure.

In other words, when a plurality of symmetrical axis alternatives are valid as a symmetrical axis of the input figure, the user can determine a symmetrical axis for shaping the input figure with the shaping symmetrical axis determining means.

As a fourth effect of the present invention, when a plurality of symmetrical axis alternatives are valid as a symmetrical axis of the input figure, a shaped result much similar to the input figure can be obtained.

In other words, when a plurality of symmetrical axis alternatives are valid as a symmetrical axis of the input figure, since the shaping symmetrical axis determining means shapes the input figure with a symmetrical axis alternative that is highly symmetrical to the input figure, the difference between the input figure and the shaped figure becomes small.

As a fifth effect of the present invention, a line symmetrical figure can be input corresponding to the intention of the user.

In other words, when the input figure is symmetrized, the user can designate an input coordinate point at which the input figure is line symmetrically shaped and an element for referencing the position of a symmetrical axis.

As a sixth effect of the present invention, two perpendicularly symmetrical axes that are perpendicular to each other are automatically extracted from a curved line figure that the user has input. Thus, a figure that has been line symmetrized to both the perpendicularly symmetrical axes can be obtained.

In other words, when a set of symmetrical axis alternatives extracted by the vertically symmetrical axis alternative determining means and the horizontally symmetrical axis alternative determining means are perpendicular to each other, it is determined whether or not the input figure is symmetrical to both the symmetrical axis alternatives. When the input figure is symmetrical to both the symmetrical axis alternatives, the input figure is shaped so that it becomes line symmetrical to both the perpendicularly symmetrical axis alternatives.

As a seventh effect of the present invention, even if an input figure is not symmetrical to perpendicular axes, the input figure can be shaped so that it becomes symmetrical to one of the symmetrical axis alternatives.

In other words, even if an input figure is not symmetrical to both perpendicular axes, when the input figure is symmetrical to one of the perpendicular axes, the one axis symmetrizing process means shapes the input figure so that the input figure becomes symmetrical to the symmetrical axis.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A line symmetrical figure shaping apparatus, comprising:

inputting means for reading an input figure and generating a sequence of coordinate points thereof;

storing means for storing the input figure and the sequence of coordinate points;

feature point detecting means for detecting the coordinates of vertexes of the input figure, the maximum point values and the minimum point values in the horizontal direction and the vertical direction thereof with the sequence of coordinate points that are input by said inputting means and storing the coordinates of vertexes to said storing means;

alternative symmetrical axis detecting means for detecting an alternative symmetrical axis for determining a symmetry of the input figure with the feature points;

symmetry determining means for determining whether or not the input figure is symmetrical to the alternative symmetrical axis; and shaping means for shaping the input figure so that the input figure becomes symmetrical to the alternative symmetrical axis that has been determined to be symmetrical to the input figure by said symmetry determining means.

2. The line symmetrical figure shaping apparatus as set forth in claim 1, wherein said alternative symmetrical axis detecting means includes:

alternative symmetrical axis calculating means for calculating an alternative symmetrical axis for determining a symmetry of the input figure with the feature points; and means for extracting the most horizontal alternative symmetrical axis and the most vertical alternative symmetrical axis from all the alternative symmetrical axes calculated by said alterative symmetrical axis calculating means.

3. The line symmetrical figure shaping apparatus as set forth in claim 1, wherein said symmetry determining means includes:

means for detecting sets of coordinate points for determining whether or not the input figure is symmetrical to the alternative symmetrical axis and for connecting the detected coordinate points with straight lines so as to generate symmetry determination segments;

distance calculating means for calculating the distance between the center point of each of the symmetry determination segment and the alternative symmetry axis; and means for calculating a deviation of the distances so as to determine whether or not the input figure is line symmetrical.

4. The line symmetrical figure shaping apparatus as set forth in claim 1, wherein said shaping means includes:

symmetrizing process means for changing the coordinate points so that the input figure becomes line symmetrical to the alternative symmetrical axis when said symmetry determining means has determined that the input figure is line symmetrical to the alternative symmetrical axis.

5. The line symmetrical figure shaping apparatus as set forth in claim 2, wherein said symmetry determining means includes:

means for detecting sets of coordinate points for determining whether or not the input figure is symmetrical to the alternative symmetrical axis and for connecting the detected coordinate points with straight lines so as to generate symmetry determination segments;

distance calculating means for calculating the distance between the center point of each of the symmetry determination segment and the alternative symmetry axis; and means for calculating a deviation of the distances so as to determine whether or not the input figure is line symmetrical.

6. The line symmetrical figure shaping apparatus as set forth in claim 2, wherein said shaping means includes:

symmetrizing process means for changing the coordinate points so that the input figure becomes line symmetrical to the alternative symmetrical axis when said symmetry determining means has determined that the input figure is line symmetrical to the alternative symmetrical axis.

7. The line symmetrical figure shaping apparatus as set forth in claim 3, wherein said shaping means includes:

symmetrizing process means for changing the coordinate points so that the input figure becomes line symmetrical to the alternative symmetrical axis when said symmetry determining means has determined that the input figure is line symmetrical to the alternative symmetrical axis.

8. A line symmetrical figure shaping apparatus, comprising:

inputting means for reading an input figure and generating a sequence of coordinate points thereof;

storing means for storing the input figure and the sequence of coordinate points;

feature point detecting means for detecting the coordinates of vertexes of the input figure, the maximum point values and the minimum point values in the horizontal direction and the vertical direction thereof with the sequence of coordinate points that are input by said inputting means and storing the coordinates of vertexes to said storing means;

alternative symmetrical axis detecting means for detecting a set of alternative symmetrical axes for determining a symmetry of the input figure with the feature points, the alternative symmetrical axes being perpendicular to each other;

symmetry determining means for determining whether or not the input figure is symmetrical to each of the set of alternative symmetrical axes; and shaping means for shaping the input figure so that the input figure becomes symmetrical to both the alternative symmetrical axes that have been determined to be symmetrical to the input figure by said symmetry determining means.

9. The line symmetrical figure shaping apparatus as set forth in claim 8, wherein said alternative symmetrical axis detecting means includes:

alternative symmetrical axis calculating means for calculating an alternative symmetrical axis for determining a symmetry of the input figure with the feature points;

means for extracting the most vertical alternative symmetrical axis from all the alternative symmetrical axes calculated by said alterative symmetrical axis calculating means;

means for extracting a horizontal alternative symmetrical axis to the extracted vertical alternative symmetrical axis; and means for determining whether or not the extracted vertical alternative symmetrical axis and the extracted horizontal alternative symmetrical axis are perpendicular to each other.

10. The line symmetrical figure shaping apparatus as set forth in claim 9, wherein said symmetry determining means includes:

vertical alternative symmetrical axis symmetry determining means for determining whether or not the input figure is symmetrical to the vertical symmetrical axis; and horizontal alternative symmetrical axis symmetry determining means for determining whether or not the input figure is symmetrical to the horizontal symmetrical axis.

11. The line symmetrical figure shaping apparatus as set forth in claim 10, wherein said shaping means includes:

symmetrizing process means for changing the coordinate points so that the input figure becomes line symmetrical to the vertically symmetrical axis and the horizontally symmetrical axis when said symmetry determining means has determined that the input figure is line symmetrical to the vertical alternative symmetrical axis and the horizontal alternative symmetrical axis.

12. The line symmetrical figure shaping apparatus as set forth in claim 10, wherein said vertical alternative symmetrical axis symmetry determining means includes:

means for detecting sets of coordinate points for determining whether or not the input figure is symmetrical to the vertical alternative symmetrical axis and for connecting the detected coordinate points so as to generate symmetry determination segments;

distance calculating means for calculating the distance between the center point of each of the symmetry determination segments and the vertical alternative symmetrical axis; and means for calculating a deviation of the calculated distances so as to determine whether or not the input figure is line symmetrical.

13. The line symmetrical figure shaping apparatus as set forth in claim 11, wherein said vertical alternative symmetrical axis symmetry determining means includes:

means for detecting sets of coordinate points for determining whether or not the input figure is symmetrical to the vertical alternative symmetrical axis and for connecting the detected coordinate points so as to generate symmetry determination segments;

distance calculating means for calculating the distance between the center point of each of the symmetry determination segments and the vertical alternative symmetrical axis; and means for calculating a deviation of the calculated distances so as to determine whether or not the input figure is line symmetrical.

14. The line symmetrical figure shaping apparatus as set forth in claim 10, wherein said horizontal alternative symmetrical axis symmetry determining means includes:

means for detecting sets of coordinate points for determining whether or not the input figure is symmetrical to the horizontal alternative symmetrical axis and for connecting the detected coordinate points so as to generate symmetry determination segments;

distance calculating means for calculating the distance between the center point of each of the symmetry determination segments and the horizontal alternative symmetrical axis; and means for calculating a deviation of the calculated distances so as to determine whether or not the input figure is line symmetrical.

15. The line symmetrical figure shaping apparatus as set forth in claim 11, wherein said horizontal alternative symmetrical axis symmetry determining means includes:

means for detecting sets of coordinate points for determining whether or not the input figure is symmetrical to the horizontal alternative symmetrical axis and for connecting the detected coordinate points so as to generate symmetry determination segments;

distance calculating means for calculating the distance between the center point of each of the symmetry determination segments and the horizontal alternative symmetrical axis; and means for calculating a deviation of the calculated distances so as to determine whether or not the input figure is line symmetrical.

16. The line symmetrical figure shaping apparatus as set forth in claim 12, wherein said horizontal alternative symmetrical axis symmetry determining means includes:

means for detecting sets of coordinate points for determining whether or not the input figure is symmetrical to the horizontal alternative symmetrical axis and for connecting the detected coordinate points so as to generate symmetry determination segments;

distance calculating means for calculating the distance between the center point of each of the symmetry determination segments and the horizontal alternative symmetrical axis; and means for calculating a deviation of the calculated distances so as to determine whether or not the input figure is line symmetrical.

17. The line symmetrical figure shaping apparatus as set forth in claim 1, wherein said shaping means includes:

shaping reference symmetrical axis determining means for determining one of the alternative symmetrical axes as a reference symmetrical axis when said symmetry determining means has determined that there are a plurality of alternative symmetrical axes of the input axis.

18. The line symmetrical figure shaping apparatus as set forth in claim 17, wherein said shaping reference symmetrical axis determining means determines the reference symmetrical axis for shaping the input figure, said shaping reference symmetrical axis determining means being externally controlled.

19. The line symmetrical figure shaping apparatus as set forth in claim 18, wherein said shaping means includes:

means for selecting a predetermined point of intersection of the reference symmetrical axis and the input figure so as to determine the position of the reference symmetrical axis, said shaping means symmetrically shaping the input figure corresponding to the positioned reference symmetrical axis.

20. The line symmetrical figure shaping apparatus as set forth in claim 1, wherein said shaping means includes:

shaping reference coordinate point determining means for determining one of the sequence of the coordinate points of the input figure so as to symmetrically shape the input figure.

21. The line symmetrical figure shaping apparatus as set forth in claim 20, wherein said shaping reference coordinate point determining means determines a reference coordinate point for shaping the input figure, said shaping reference coordinate point determining means being externally controlled.

22. The line symmetrical figure shaping apparatus as set forth in claim 2, wherein said shaping means includes:

shaping reference symmetrical axis determining means for determining one of the alternative symmetrical axes as a reference symmetrical axis when said symmetry determining means has determined that there are a plurality of alternative symmetrical axes of the input axis.

23. The line symmetrical figure shaping apparatus as set forth in claim 22, wherein said shaping reference symmetrical axis determining means determines the reference symmetrical axis for shaping the input figure, said shaping reference symmetrical axis determining means being externally controlled.

24. The line symmetrical figure shaping apparatus as set forth in claim 23, wherein said shaping means includes:

means for selecting a predetermined point of intersection of the reference symmetrical axis and the input figure so as to determine the position of the reference symmetrical axis, said shaping means symmetrically shaping the input figure corresponding to the positioned reference symmetrical axis.

25. The line symmetrical figure shaping apparatus as set forth in claim 2, wherein said shaping means includes:

shaping reference coordinate point determining means for determining one of the sequence of the coordinate points of the input figure so as to symmetrically shape the input figure.

26. The line symmetrical figure shaping apparatus as set forth in claim 25, wherein said shaping reference coordinate point determining means determines a reference coordinate point for shaping the input figure, said shaping reference coordinate point determining means being externally controlled.

27. The line symmetrical figure shaping apparatus as set forth in claim 3, wherein said shaping means includes:

shaping reference symmetrical axis determining means for determining one of the alternative symmetrical axes as a reference symmetrical axis when said symmetry determining means has determined that there are a plurality of alternative symmetrical axes of the input axis.

28. The line symmetrical figure shaping apparatus as set forth in claim 27, wherein said shaping reference symmetrical axis determining means determines the reference symmetrical axis for shaping the input figure, said shaping reference symmetrical axis determining means being externally controlled.

29. The line symmetrical figure shaping apparatus as set forth in claim 28, wherein said shaping means includes:

means for selecting a predetermined point of intersection of the reference symmetrical axis and the input figure so as to determine the position of the reference symmetrical axis, said shaping means symmetrically shaping the input figure corresponding to the positioned reference symmetrical axis.

30. The line symmetrical figure shaping apparatus as set forth in claim 3, wherein said shaping means includes:

shaping reference coordinate point determining means for determining one of the sequence of the coordinate points of the input figure so as to symmetrically shape the input figure.

31. The line symmetrical figure shaping apparatus as set forth in claim 30, wherein said shaping reference coordinate point determining means determines a reference coordinate point for shaping the input figure, said shaping reference coordinate point determining means being externally controlled.

32. The line symmetrical figure shaping apparatus as set forth in claim 8, wherein said shaping means includes:

shaping reference symmetrical axis determining means for determining one of the alternative symmetrical axes as a reference symmetrical axis when said symmetry determining means has determined that there are a plurality of alternative symmetrical axes of the input axis.

33. The line symmetrical figure shaping apparatus as set forth in claim 32, wherein said shaping reference symmetrical axis determining means determines the reference symmetrical axis for shaping the input figure, said shaping reference symmetrical axis determining means being externally controlled.

34. The line symmetrical figure shaping apparatus as set forth in claim 33, wherein said shaping means includes:

means for selecting a predetermined point of intersection of the reference symmetrical axis and the input figure so as to determine the position of the reference symmetrical axis, said shaping means symmetrically shaping the input figure corresponding to the positioned reference symmetrical axis.

35. The line symmetrical figure shaping apparatus as set forth in claim 8, wherein said shaping means includes:

shaping reference coordinate point determining means for determining one of the sequence of the coordinate points of the input figure so as to symmetrically shape the input figure.

36. The line symmetrical figure shaping apparatus as set forth in claim 35, wherein said shaping reference coordinate point determining means determines a reference coordinate point for shaping the input figure, said shaping reference coordinate point determining means being externally controlled.

37. The line symmetrical figure shaping apparatus as set forth in claim 9, wherein said shaping means includes:

shaping reference symmetrical axis determining means for determining one of the alternative symmetrical axes as a reference symmetrical axis when said symmetry determining means has determined that there are a plurality of alternative symmetrical axes of the input axis.

38. The line symmetrical figure shaping apparatus as set forth in claim 37, wherein said shaping reference symmetrical axis determining means determines the reference symmetrical axis for shaping the input figure, said shaping reference symmetrical axis determining means being externally controlled.

39. The line symmetrical figure shaping apparatus as set forth in claim 38, wherein said shaping means includes:

means for selecting a predetermined point of intersection of the reference symmetrical axis and the input figure so as to determine the position of the reference symmetrical axis, said shaping means symmetrically shaping the input figure corresponding to the positioned reference symmetrical axis.

40. The line symmetrical figure shaping apparatus as set forth in claim 9, wherein said shaping means includes:

shaping reference coordinate point determining means for determining one of the sequence of the coordinate points of the input figure so as to symmetrically shape the input figure.

41. The line symmetrical figure shaping apparatus as set forth in claim 40, wherein said shaping reference coordinate point determining means determines a reference coordinate point for shaping the input figure, said shaping reference coordinate point determining means being externally controlled.

42. The line symmetrical figure shaping apparatus as set forth in claim 10, wherein said shaping means includes:

shaping reference symmetrical axis determining means for determining one of the alternative symmetrical axes as a reference symmetrical axis when said symmetry determining means has determined that there are a plurality of alternative symmetrical axes of the input axis.

43. The line symmetrical figure shaping apparatus as set forth in claim 42, wherein said shaping reference symmetrical axis determining means determines the reference symmetrical axis for shaping the input figure, said shaping reference symmetrical axis determining means being externally controlled.

44. The line symmetrical figure shaping apparatus as set forth in claim 43, wherein said shaping means includes:

means for selecting a predetermined point of intersection of the reference symmetrical axis and the input figure so as to determine the position of the reference symmetrical axis, said shaping means symmetrically shaping the input figure corresponding to the positioned reference symmetrical axis.

45. The line symmetrical figure shaping apparatus as set forth in claim 10, wherein said shaping means includes:

shaping reference coordinate point determining means for determining one of the sequence of the coordinate points of the input figure so as to symmetrically shape the input figure.

46. The line symmetrical figure shaping apparatus as set forth in claim 45, wherein said shaping reference coordinate point determining means determines a reference coordinate point for shaping the input figure, said shaping reference coordinate point determining means being externally controlled.

47. The line symmetrical figure shaping apparatus as set forth in claim 5, wherein said shaping means includes:

symmetrizing process means for changing the coordinate points so that the input figure becomes line symmetrical to the alternative symmetrical axis when said symmetry determining means has determined that the input figure is line symmetrical to the alternative symmetrical axis.

48. The line symmetrical figure shaping apparatus as set forth in claim 13, wherein said horizontal alternative symmetrical axis symmetry determining means includes:

means for detecting sets of coordinate points for determining whether or not the input figure is symmetrical to the horizontal alternative symmetrical axis and for connecting the detected coordinate points so as to generate symmetry determination segments;

distance calculating means for calculating the distance between the center point of each of the symmetry determination segments and the horizontal alternative symmetrical axis; and means for calculating a deviation of the calculated distances so as to determine whether or not the input figure is line symmetrical.

49. The line symmetrical figure shaping apparatus as set forth in claim 3, wherein said symmetry determining means further, includes:

symmetry input point set validity determining means for determining whether or not the calculated distance by said distance calculating means exceeds a predetermined threshold value.

50. The line symmetrical figure shaping apparatus as set forth in claim 5, wherein said symmetry determining means further, includes:

symmetry input point set validity determining means for determining whether or not the calculated distance by said distance calculating means exceeds a predetermined threshold value.

51. The line symmetrical figure shaping apparatus as set forth in claim 12, wherein said symmetry determining means further, includes:

symmetry input point set validity determining means for determining whether or not the calculated distance by said distance calculating means exceeds a predetermined threshold value.

52. The line symmetrical figure shaping apparatus as set forth in claim 4, wherein said shaping means includes:

a one axis symmetrizing process means for determining whether or not one of outputs of said symmetrizing process means is valid as a valid symmetrical axis of the input figure, and said one axis symmetrizing process means symmetrizes the symmetrical axis alternative.

53. The line symmetrical figure shaping apparatus as set forth in claim 6, wherein said shaping means further includes:

a one axis symmetrizing process means for determining whether or not one of outputs of said symmetrizing process means is valid as a valid symmetrical axis of the input figure, and said one axis symmetrizing process means symmetrizes the symmetrical axis alternative.

54. The line symmetrical figure shaping apparatus as set forth in claim 11, wherein said shaping means further includes:

a one axis symmetrizing process means for determining whether or not one of outputs of said symmetrizing process means is valid as a valid symmetrical axis of the input figure, and said one axis symmetrizing process means symmetrizes the symmetrical axis alternative.

* * * * *